US012211337B2

(12) United States Patent
Ramos et al.

(10) Patent No.: US 12,211,337 B2
(45) **Date of Patent: *Jan. 28, 2025**

(54) GAMING SYSTEM AND METHOD FOR PLACING AND REDEEMING SPORTS BETS

(71) Applicant: IGT, Las Vegas, NV (US)

(72) Inventors: Errol A. Ramos, Reno, NV (US); Mathew H. Henderson, Reno, NV (US); Paul C. Ewing, Reno, NV (US); Erik B. Chalko, Reno, NV (US); David C. Pence, Reno, NV (US); Tyrell J. Atterberry, Reno, NV (US); Kimberly A. Carestia, Sparks, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,791

(22) Filed: Aug. 22, 2023

(65) Prior Publication Data

US 2023/0410592 A1 Dec. 21, 2023

Related U.S. Application Data

(63) Continuation of application No. 16/993,589, filed on Aug. 14, 2020, now Pat. No. 11,769,365, which is a continuation of application No. 16/038,942, filed on Jul. 18, 2018, now abandoned, which is a continuation of application No. 14/823,753, filed on Aug. 11, 2015, now Pat. No. 10,055,930.

(51) Int. Cl.
*G07F 17/32* (2006.01)
*G07F 17/42* (2006.01)

(52) U.S. Cl.
CPC ...... *G07F 17/3209* (2013.01); *G07F 17/3239* (2013.01); *G07F 17/3244* (2013.01); *G07F 17/3255* (2013.01); *G07F 17/3288* (2013.01); *G07F 17/42* (2013.01)

(58) Field of Classification Search
CPC ......................... G07F 17/3244; G07F 17/3209
See application file for complete search history.

(56) References Cited

U.S. PATENT DOCUMENTS

| | | | |
|---|---|---|---|
| 3,662,105 | A | 5/1972 | Parks |
| 3,708,219 | A | 1/1973 | Forlini et al. |
| 3,792,437 | A | 2/1974 | Blumenthal |
| 3,931,504 | A | 1/1976 | Jacoby |

(Continued)

FOREIGN PATENT DOCUMENTS

| | | |
|---|---|---|
| AU | 704691 | 4/1999 |
| AU | 775882 | 8/2004 |

(Continued)

OTHER PUBLICATIONS

Australian Examination Report No. 1 for Application No. 2016210758 dated Mar. 4, 2021 (4 pages).

*Primary Examiner* — David L Lewis
*Assistant Examiner* — Robert E Mosser
(74) *Attorney, Agent, or Firm* — Neal, Gerber & Eisenberg LLP

(57) ABSTRACT

Gaming systems and methods for placing one or more sports bets at an electronic gaming machine ("EGM") and for redeeming any winnings for one or more placed sports bet at an EGM.

20 Claims, 14 Drawing Sheets

(56) References Cited

U.S. PATENT DOCUMENTS 4,071,689 A 1/1978 Talmage
4,072,930 A 2/1978 Lucero
4,124,109 A 11/1978 Bissett
4,191,376 A 3/1980 Goldman et al.
4,218,011 A 8/1980 Simjian
4,283,709 A 8/1981 Lucero
4,333,715 A 6/1982 Brooks
4,339,709 A 7/1982 Brihier
4,339,798 A 7/1982 Hedges et al.
4,430,728 A 2/1984 Beitel et al.
4,454,594 A 6/1984 Heffron et al.
4,517,558 A 5/1985 Davids
4,553,222 A 11/1985 Kurland
4,582,324 A 4/1986 Koza et al.
4,607,844 A 8/1986 Fullerton
4,621,814 A 11/1986 Stepan et al.
4,659,182 A 4/1987 Aizawa
4,669,730 A 6/1987 Small
4,669,731 A 6/1987 Clarke
4,679,143 A 7/1987 Hagiwara
4,689,742 A 8/1987 Troy et al.
4,695,053 A 9/1987 Vazquez, Jr. et al.
4,718,672 A 1/1988 Okada
4,743,002 A 5/1988 Menzel
4,775,155 A 10/1988 Lees
4,805,907 A 2/1989 Hagiwara
4,817,951 A 4/1989 Crouch et al.
4,837,728 A 6/1989 Barrie et al.
4,856,787 A 8/1989 Itkis
4,871,171 A 10/1989 Rivero
4,874,164 A 10/1989 Miner et al.
4,911,449 A 3/1990 Dickinson et al.
4,912,548 A 3/1990 Shanker et al.
4,922,522 A 5/1990 Scanlon
5,019,973 A 5/1991 Wilcox et al.
5,038,022 A 8/1991 Lucero
5,039,848 A 8/1991 Stoken
5,042,809 A 8/1991 Richardson
5,048,831 A 9/1991 Sides
5,083,271 A 1/1992 Thacher et al.
5,086,354 A 2/1992 Bass et al.
5,097,981 A 3/1992 Degasperi et al.
5,113,272 A 5/1992 Reamey
5,132,839 A 7/1992 Travis
5,152,529 A 10/1992 Okada
5,158,293 A 10/1992 Mullins
5,179,517 A 1/1993 Sarbin
5,186,460 A 2/1993 Fongeallaz et al.
5,221,838 A 6/1993 Gutman
5,242,163 A 9/1993 Fulton
5,248,142 A 9/1993 Breeding
5,259,613 A 11/1993 Marnell, II
5,265,874 A 11/1993 Dickinson et al.
5,275,400 A 1/1994 Weingardt et al.
5,288,081 A 2/1994 Breeding
5,290,033 A 3/1994 Bittner et al.
5,297,252 A 3/1994 Becker
5,319,491 A 6/1994 Selbrede
5,333,868 A 8/1994 Goldfarb
5,342,047 A 8/1994 Heidel et al.
5,348,299 A 9/1994 Clapper
5,351,970 A 10/1994 Fioretti
5,356,140 A 10/1994 Dabrowski et al.
5,364,100 A 11/1994 Ludlow et al.
5,371,345 A 12/1994 LeStrange et al.
5,375,830 A 12/1994 Takemoto et al.
5,376,587 A 12/1994 Buchmann et al.
5,393,057 A 2/1995 Marnell, II
5,393,061 A 2/1995 Manship et al.
5,393,067 A 2/1995 Paulsen et al.
5,397,125 A 3/1995 Adams
5,408,417 A 4/1995 Wilder
5,408,600 A 4/1995 Garfinkel et al.
5,411,271 A 5/1995 Mirando
5,415,416 A 5/1995 Scagnelli et al.
5,417,430 A 5/1995 Breeding
5,429,361 A 7/1995 Raven et al.
5,457,306 A 10/1995 Lucero
5,467,893 A 11/1995 Landis, II et al.
5,470,079 A 11/1995 LeStrange et al.
5,471,577 A 11/1995 Lightbody et al.
5,472,194 A 12/1995 Breeding et al.
5,472,197 A 12/1995 Gwiasda et al.
5,483,049 A 1/1996 Schulze
5,487,544 A 1/1996 Clapper
5,489,096 A 2/1996 Aron
5,502,636 A 3/1996 Clarke
5,536,016 A 7/1996 Thompson
5,539,547 A 7/1996 Ishii et al.
5,544,892 A 8/1996 Breeding
5,559,312 A 9/1996 Lucero
5,560,603 A 10/1996 Seelig et al.
5,564,701 A 10/1996 Dettor
5,580,055 A 12/1996 Hagiwara
5,580,309 A 12/1996 Piechowiak et al.
5,585,821 A 12/1996 Ishikura et al.
5,589,980 A 12/1996 Bass et al.
5,609,337 A 3/1997 Clapper, Jr.
5,611,730 A 3/1997 Weiss
5,613,679 A 3/1997 Casa et al.
5,618,045 A 4/1997 Kagan et al.
5,619,649 A 4/1997 Kovnat et al.
5,621,812 A 4/1997 Deaton et al.
5,628,684 A 5/1997 Bouedec
5,630,753 A 5/1997 Fuchs
5,639,089 A 6/1997 Matsumoto et al.
5,642,485 A 6/1997 Deaton et al.
5,643,086 A 7/1997 Alcorn et al.
5,645,485 A 7/1997 Clapper
5,645,486 A 7/1997 Nagao et al.
5,647,592 A 7/1997 Gerow
5,647,798 A 7/1997 Falciglia
5,655,961 A 8/1997 Acres et al.
5,664,998 A 9/1997 Seelig et al.
5,673,917 A 10/1997 Vancura
5,676,231 A 10/1997 Legras
5,702,304 A 12/1997 Acres
5,709,603 A 1/1998 Kaye
5,718,632 A 2/1998 Hayashi
5,722,890 A 3/1998 Libby et al.
5,741,183 A 4/1998 Acres et al.
5,745,197 A 4/1998 Leung et al.
5,749,784 A 5/1998 Clapper
5,752,881 A 5/1998 Inoue
5,755,619 A 5/1998 Matsumoto et al.
5,758,875 A 6/1998 Giacalone, Jr.
5,759,102 A 6/1998 Pease
5,761,647 A 6/1998 Boushy
5,764,317 A 6/1998 Sadnovik et al.
5,768,382 A 6/1998 Schneier
5,769,716 A 6/1998 Saffari et al.
5,770,533 A 6/1998 Franchi
5,779,242 A 7/1998 Kaufmann
5,779,544 A 7/1998 Seelig et al.
5,779,545 A 7/1998 Berg
5,779,549 A 7/1998 Walker et al.
5,785,594 A 7/1998 Seibert et al.
5,788,573 A 8/1998 Baerlocher et al.
5,788,574 A 8/1998 Ornstein et al.
5,790,818 A 8/1998 Martin
5,795,228 A 8/1998 Trumball
5,796,389 A 8/1998 Bertram
5,797,085 A 8/1998 Beuk
5,806,045 A 9/1998 Biorge et al.
5,809,482 A 9/1998 Strisower
5,811,772 A 9/1998 Lucero
5,816,918 A 10/1998 Kelly et al.
5,818,019 A 10/1998 Irwin
5,820,460 A 10/1998 Fulton
5,823,874 A 10/1998 Adams
5,833,536 A 11/1998 Davids et al.
5,833,537 A 11/1998 Barrie
5,833,540 A 11/1998 Miodunski
5,836,819 A 11/1998 Ugawa

(56) References Cited

U.S. PATENT DOCUMENTS

| | | | |
|---|---|---|---|
| 5,839,730 | A | 11/1998 | Pike |
| 5,848,932 | A | 12/1998 | Adams |
| 5,851,148 | A | 12/1998 | Burne et al. |
| 5,851,149 | A | 12/1998 | Xidos et al. |
| D404,436 | S | 1/1999 | McGahn et al. |
| 5,855,515 | A | 1/1999 | Pease et al. |
| 5,871,398 | A | 2/1999 | Schneier et al. |
| D406,612 | S | 3/1999 | Johnson |
| 5,876,284 | A | 3/1999 | Acres et al. |
| 5,882,261 | A | 3/1999 | Adams |
| 5,885,158 | A | 3/1999 | Torango et al. |
| 5,890,962 | A | 4/1999 | Takemoto |
| 5,902,184 | A | 5/1999 | Bennett |
| 5,902,983 | A | 5/1999 | Crevelt et al. |
| 5,910,046 | A | 6/1999 | Wada et al. |
| 5,911,418 | A | 6/1999 | Adams |
| 5,919,088 | A | 7/1999 | Weiss |
| 5,919,091 | A | 7/1999 | Bell et al. |
| 5,923,307 | A | 7/1999 | Hogle, IV |
| 5,923,379 | A | 7/1999 | Patterson |
| 5,924,927 | A | 7/1999 | Matsuura et al. |
| 5,927,714 | A | 7/1999 | Kaplan |
| 5,928,082 | A | 7/1999 | Clapper |
| 5,934,671 | A | 8/1999 | Harrison |
| 5,935,000 | A | 8/1999 | Sanchez, III et al. |
| 5,935,002 | A | 8/1999 | Falciglia |
| 5,941,733 | A | 8/1999 | Lai |
| 5,941,772 | A | 8/1999 | Paige |
| 5,947,820 | A | 9/1999 | Morro et al. |
| 5,951,397 | A | 9/1999 | Dickinson |
| 5,952,640 | A | 9/1999 | Lucero |
| 5,954,583 | A | 9/1999 | Green |
| 5,956,180 | A | 9/1999 | Bass et al. |
| 5,957,776 | A | 9/1999 | Hoehne |
| 5,959,277 | A | 9/1999 | Lucero |
| 5,967,893 | A | 10/1999 | Lawrence et al. |
| 5,967,896 | A | 10/1999 | Jorasch et al. |
| 5,971,271 | A | 10/1999 | Wynn et al. |
| 5,976,015 | A | 11/1999 | Seelig et al. |
| 5,980,384 | A | 11/1999 | Barrie |
| 5,984,779 | A | 11/1999 | Bridgeman et al. |
| 5,993,316 | A | 11/1999 | Coyle et al. |
| 5,995,146 | A | 11/1999 | Rasmussen |
| 5,997,400 | A | 12/1999 | Seelig et al. |
| 5,997,401 | A | 12/1999 | Crawford |
| 5,999,808 | A | 12/1999 | LaDue |
| 6,001,016 | A | 12/1999 | Walker et al. |
| 6,003,013 | A | 12/1999 | Boushy et al. |
| 6,003,651 | A | 12/1999 | Waller et al. |
| 6,004,208 | A | 12/1999 | Takemoto et al. |
| 6,010,404 | A | 1/2000 | Walker et al. |
| 6,012,832 | A | 1/2000 | Saunders et al. |
| 6,012,982 | A | 1/2000 | Piechowiak et al. |
| 6,012,983 | A | 1/2000 | Walker et al. |
| 6,015,346 | A | 1/2000 | Bennett |
| 6,019,283 | A | 2/2000 | Lucero |
| 6,019,369 | A | 2/2000 | Nakagawa et al. |
| 6,019,374 | A | 2/2000 | Breeding |
| 6,024,643 | A | 2/2000 | Begis |
| 6,027,115 | A | 2/2000 | Griswold et al. |
| 6,038,666 | A | 3/2000 | Hsu et al. |
| 6,039,648 | A | 3/2000 | Guinn et al. |
| 6,048,269 | A | 4/2000 | Burns et al. |
| 6,050,895 | A | 4/2000 | Luciano et al. |
| 6,054,969 | A | 4/2000 | Haisma |
| 6,056,641 | A | 5/2000 | Webb |
| 6,059,658 | A | 5/2000 | Mangano et al. |
| 6,062,981 | A | 5/2000 | Luciano |
| 6,068,552 | A | 5/2000 | Walker et al. |
| 6,077,162 | A | 6/2000 | Weiss |
| 6,077,163 | A | 6/2000 | Walker et al. |
| 6,082,887 | A | 7/2000 | Feuer et al. |
| 6,089,975 | A | 7/2000 | Dunn |
| 6,089,976 | A | 7/2000 | Schneider et al. |
| 6,089,978 | A | 7/2000 | Adams |
| 6,089,981 | A | 7/2000 | Brenner et al. |
| 6,092,806 | A | 7/2000 | Follis |
| 6,093,102 | A | 7/2000 | Bennett |
| 6,099,408 | A | 8/2000 | Schneier et al. |
| 6,102,400 | A | 8/2000 | Scott et al. |
| 6,104,815 | A | 8/2000 | Alcorn et al. |
| 6,106,396 | A | 8/2000 | Alcorn et al. |
| 6,110,041 | A | 8/2000 | Walker et al. |
| 6,110,043 | A | 8/2000 | Olsen |
| 6,113,098 | A | 9/2000 | Adams |
| 6,113,492 | A | 9/2000 | Walker et al. |
| 6,113,493 | A | 9/2000 | Walker et al. |
| 6,113,495 | A | 9/2000 | Walker et al. |
| 6,120,377 | A | 9/2000 | McGinnis, Sr. et al. |
| 6,120,378 | A | 9/2000 | Moody et al. |
| 6,128,550 | A | 10/2000 | Heidel et al. |
| 6,135,884 | A | 10/2000 | Hedrick et al. |
| 6,135,885 | A | 10/2000 | Lermusiaux |
| 6,135,887 | A | 10/2000 | Pease et al. |
| 6,139,431 | A | 10/2000 | Walker et al. |
| 6,141,711 | A | 10/2000 | Shah et al. |
| 6,142,369 | A | 11/2000 | Jonstromer |
| 6,142,872 | A | 11/2000 | Walker et al. |
| 6,146,273 | A | 11/2000 | Olsen |
| 6,149,522 | A | 11/2000 | Alcorn et al. |
| 6,159,095 | A | 12/2000 | Frohm et al. |
| 6,159,097 | A | 12/2000 | Gura |
| 6,159,098 | A | 12/2000 | Slomiany et al. |
| 6,161,059 | A | 12/2000 | Tedesco et al. |
| 6,162,121 | A | 12/2000 | Morro et al. |
| 6,162,122 | A | 12/2000 | Acres et al. |
| 6,165,071 | A | 12/2000 | Weiss |
| 6,165,072 | A | 12/2000 | Davis et al. |
| 6,168,521 | B1 | 1/2001 | Luciano et al. |
| 6,174,234 | B1 | 1/2001 | Seibert et al. |
| 6,182,221 | B1 | 1/2001 | Hsu et al. |
| 6,183,362 | B1 | 2/2001 | Boushy |
| 6,186,893 | B1 | 2/2001 | Walker et al. |
| 6,186,894 | B1 | 2/2001 | Mayeroff |
| 6,190,255 | B1 | 2/2001 | Thomas et al. |
| 6,190,256 | B1 | 2/2001 | Walker et al. |
| 6,193,606 | B1 | 2/2001 | Walker et al. |
| 6,193,607 | B1 | 2/2001 | Kay |
| 6,193,608 | B1 | 2/2001 | Walker et al. |
| 6,203,010 | B1 | 3/2001 | Jorasch et al. |
| 6,203,428 | B1 | 3/2001 | Giobbi et al. |
| 6,203,429 | B1 | 3/2001 | Demar et al. |
| 6,203,430 | B1 | 3/2001 | Walker et al. |
| 6,206,283 | B1 | 3/2001 | Bansal et al. |
| 6,206,782 | B1 | 3/2001 | Walker et al. |
| 6,210,275 | B1 | 4/2001 | Olsen |
| 6,210,277 | B1 | 4/2001 | Stefan |
| 6,210,279 | B1 | 4/2001 | Dickinson |
| 6,213,875 | B1 | 4/2001 | Suzuki |
| 6,223,166 | B1 | 4/2001 | Kay |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,486 | B1 | 5/2001 | Walker et al. |
| 6,227,969 | B1 | 5/2001 | Yoseloff |
| 6,227,972 | B1 | 5/2001 | Walker et al. |
| 6,231,442 | B1 | 5/2001 | Mayeroff |
| 6,231,445 | B1 | 5/2001 | Acres |
| 6,234,892 | B1 | 5/2001 | Geyer et al. |
| 6,238,287 | B1 | 5/2001 | Komori et al. |
| 6,244,596 | B1 | 6/2001 | Kondratjuk |
| 6,244,958 | B1 | 6/2001 | Acres |
| 6,247,643 | B1 | 6/2001 | Lucero |
| 6,251,014 | B1 | 6/2001 | Stockdale et al. |
| 6,252,707 | B1 | 6/2001 | Kleinberger et al. |
| 6,253,119 | B1 | 6/2001 | Dabrowski |
| 6,253,374 | B1 | 6/2001 | Dresevic et al. |
| 6,254,481 | B1 | 7/2001 | Jaffe |
| 6,264,560 | B1 | 7/2001 | Goldberg et al. |
| 6,264,561 | B1 | 7/2001 | Saffari et al. |
| 6,267,671 | B1 | 7/2001 | Hogan |
| 6,270,410 | B1 | 8/2001 | DeMar et al. |
| 6,280,328 | B1 | 8/2001 | Holch et al. |
| 6,285,868 | B1 | 9/2001 | LaDue |

(56) References Cited

U.S. PATENT DOCUMENTS

| | | | |
|---|---|---|---|
| 6,287,202 | B1 | 9/2001 | Pascal et al. |
| 6,293,866 | B1 | 9/2001 | Walker et al. |
| 6,302,790 | B1 | 10/2001 | Brossard |
| 6,307,956 | B1 | 10/2001 | Black |
| 6,309,299 | B1 | 10/2001 | Weiss |
| 6,309,307 | B1 | 10/2001 | Krause et al. |
| 6,312,332 | B1 | 11/2001 | Walker et al. |
| 6,315,660 | B1 | 11/2001 | DeMar et al. |
| 6,315,666 | B1 | 11/2001 | Mastera et al. |
| 6,319,125 | B1 | 11/2001 | Acres |
| 6,336,857 | B1 | 1/2002 | McBride |
| 6,337,513 | B1 | 1/2002 | Clevenger et al. |
| 6,338,678 | B1 | 1/2002 | Seelig et al. |
| 6,341,353 | B1 | 1/2002 | Herman et al. |
| 6,347,996 | B1 | 2/2002 | Gilmore et al. |
| 6,354,941 | B2 | 3/2002 | Miller et al. |
| 6,364,765 | B1 | 4/2002 | Walker et al. |
| 6,368,216 | B1 | 4/2002 | Hedrick et al. |
| 6,371,852 | B1 | 4/2002 | Acres |
| 6,373,500 | B1 | 4/2002 | Daniels |
| 6,375,567 | B1 | 4/2002 | Acres |
| 6,378,073 | B1 | 4/2002 | Davis et al. |
| 6,379,244 | B1 | 4/2002 | Sagawa et al. |
| 6,379,246 | B1 | 4/2002 | Dabrowski |
| 6,383,076 | B1 | 5/2002 | Tiedeken |
| 6,394,907 | B1 | 5/2002 | Rowe |
| 6,398,220 | B1 | 6/2002 | Inoue |
| 6,409,595 | B1 | 6/2002 | Uihlein et al. |
| 6,409,602 | B1 | 6/2002 | Wiltshire et al. |
| 6,416,827 | B1 | 7/2002 | Chakrapani et al. |
| 6,425,823 | B1 | 7/2002 | Byrne |
| 6,443,841 | B1 | 9/2002 | Rossides |
| 6,443,843 | B1 | 9/2002 | Walker et al. |
| 6,444,496 | B1 | 9/2002 | Edwards et al. |
| 6,445,185 | B1 | 9/2002 | Damadian et al. |
| 6,446,257 | B1 | 9/2002 | Pradhan et al. |
| 6,449,687 | B1 | 9/2002 | Moriya |
| 6,450,885 | B2 | 9/2002 | Schneier et al. |
| 6,453,319 | B1 | 9/2002 | Mattis et al. |
| 6,454,648 | B1 | 9/2002 | Kelly et al. |
| 6,488,585 | B1 | 12/2002 | Wells et al. |
| 6,491,583 | B1 | 12/2002 | Gauselmann |
| 6,496,928 | B1 | 12/2002 | Deo et al. |
| 6,503,147 | B1 | 1/2003 | Stockdale et al. |
| 6,508,709 | B1 | 1/2003 | Karmarkar |
| 6,511,375 | B1 | 1/2003 | Kaminkow |
| 6,512,559 | B1 | 1/2003 | Hashimoto et al. |
| 6,514,141 | B1 | 2/2003 | Kaminkow et al. |
| 6,517,073 | B1 | 2/2003 | Vancura |
| 6,517,433 | B2 | 2/2003 | Loose et al. |
| 6,517,437 | B1 | 2/2003 | Wells et al. |
| 6,523,829 | B1 | 2/2003 | Walker et al. |
| 6,530,835 | B1 | 3/2003 | Walker et al. |
| 6,547,664 | B2 | 4/2003 | Sauders |
| 6,561,903 | B2 | 5/2003 | Walker et al. |
| 6,575,541 | B1 | 6/2003 | Hedrick et al. |
| 6,581,161 | B1 | 6/2003 | Byford |
| 6,582,310 | B1 | 6/2003 | Walker et al. |
| 6,585,589 | B2 | 7/2003 | Okuniewicz |
| 6,585,591 | B1 | 7/2003 | Baerlocher et al. |
| 6,585,598 | B2 | 7/2003 | Nguyen et al. |
| 6,607,195 | B2 | 8/2003 | Vancura |
| 6,620,047 | B1 | 9/2003 | Alcorn et al. |
| 6,623,357 | B2 | 9/2003 | Chowdhury |
| 6,628,939 | B2 | 9/2003 | Paulsen |
| D480,961 | S | 10/2003 | Deadman |
| 6,634,550 | B1 | 10/2003 | Walker et al. |
| 6,645,077 | B2 | 11/2003 | Rowe |
| 6,646,695 | B1 | 11/2003 | Gauselmann |
| 6,648,761 | B1 | 11/2003 | Izawa et al. |
| 6,652,378 | B2 | 11/2003 | Cannon et al. |
| 6,656,040 | B1 | 12/2003 | Brosnan et al. |
| 6,659,864 | B2 | 12/2003 | McGahn et al. |
| 6,661,425 | B1 | 12/2003 | Hiroaki |
| 6,676,522 | B2 | 1/2004 | Rowe et al. |
| 6,679,497 | B2 | 1/2004 | Walker et al. |
| 6,682,421 | B1 | 1/2004 | Rowe et al. |
| 6,685,567 | B2 | 2/2004 | Cockerille et al. |
| 6,692,003 | B2 | 2/2004 | Potter et al. |
| 6,695,703 | B1 | 2/2004 | McGahn |
| 6,702,289 | B1 | 3/2004 | Feola |
| 6,702,670 | B2 | 3/2004 | Jasper et al. |
| 6,702,675 | B2 | 3/2004 | Poole et al. |
| 6,712,694 | B1 | 3/2004 | Nordman |
| 6,715,756 | B2 | 4/2004 | Inoue |
| 6,717,728 | B2 | 4/2004 | Putilin |
| 6,722,979 | B2 | 4/2004 | Gilmore et al. |
| 6,726,565 | B2 | 4/2004 | Hughs-Baird |
| 6,739,975 | B2 | 5/2004 | Nguyen et al. |
| 6,758,393 | B1 | 7/2004 | Luciano et al. |
| 6,769,982 | B1 | 8/2004 | Brosnan |
| 6,786,824 | B2 | 9/2004 | Cannon |
| 6,789,801 | B2 | 9/2004 | Snow |
| 6,800,029 | B2 | 10/2004 | Rowe et al. |
| 6,802,777 | B2 | 10/2004 | Seelig et al. |
| 6,804,763 | B1 | 10/2004 | Stockdale et al. |
| 6,811,486 | B1 | 11/2004 | Luciano, Jr. |
| 6,817,945 | B2 | 11/2004 | Seelig et al. |
| 6,817,946 | B2 | 11/2004 | Motegi et al. |
| 6,846,238 | B2 | 1/2005 | Wells |
| 6,860,810 | B2 | 3/2005 | Cannon et al. |
| 6,863,608 | B1 | 3/2005 | LeMay et al. |
| 6,866,586 | B2 | 3/2005 | Oberberger et al. |
| 6,869,362 | B2 | 3/2005 | Walker et al. |
| 6,880,079 | B2 | 4/2005 | Kefford et al. |
| 6,887,157 | B2 | 5/2005 | LeMay et al. |
| 6,890,259 | B2 | 5/2005 | Breckner et al. |
| 6,893,342 | B1 | 5/2005 | Singer et al. |
| 6,896,618 | B2 | 5/2005 | Benoy et al. |
| 6,905,411 | B2 | 6/2005 | Nguyen et al. |
| 6,906,762 | B1 | 6/2005 | Witehira et al. |
| 6,913,534 | B2 | 7/2005 | DeFrees-Parrott et al. |
| 6,928,413 | B1 | 8/2005 | Pulitzer |
| 6,937,298 | B2 | 8/2005 | Okada |
| 6,942,574 | B1 | 9/2005 | LeMay et al. |
| 6,969,319 | B2 | 11/2005 | Rowe et al. |
| 6,997,803 | B2 | 2/2006 | LeMay et al. |
| 7,004,388 | B2 | 2/2006 | Kohta |
| 7,004,837 | B1 | 2/2006 | Crowder, Jr. et al. |
| 7,008,320 | B2 | 3/2006 | Rowe et al. |
| 7,008,321 | B2 | 3/2006 | Rowe et al. |
| 7,022,017 | B1 | 4/2006 | Halbritter et al. |
| 7,029,395 | B1 | 4/2006 | Baerlocher |
| 7,095,180 | B2 | 8/2006 | Emslie et al. |
| 7,097,560 | B2 | 8/2006 | Okada |
| 7,111,845 | B2 | 9/2006 | Walker et al. |
| 7,125,333 | B2 | 10/2006 | Brosnan |
| 7,128,647 | B2 | 10/2006 | Muir et al. |
| 7,153,210 | B2 | 12/2006 | Yamagishi |
| 7,159,865 | B2 | 1/2007 | Okada |
| 7,160,187 | B2 | 1/2007 | Loose et al. |
| 7,167,724 | B2 | 1/2007 | Yamagishi |
| 7,201,654 | B1 | 4/2007 | Jarvis et al. |
| 7,204,753 | B2 | 4/2007 | Ozaki et al. |
| 7,207,883 | B2 | 4/2007 | Nozaki et al. |
| 7,220,181 | B2 | 5/2007 | Okada |
| 7,252,288 | B2 | 8/2007 | Seelig et al. |
| 7,255,643 | B2 | 8/2007 | Ozaki et al. |
| 7,275,991 | B2 | 10/2007 | Burns et al. |
| 7,309,284 | B2 | 12/2007 | Griswold et al. |
| 7,322,884 | B2 | 1/2008 | Emori et al. |
| 7,326,115 | B2 | 2/2008 | Baerlocher |
| 7,329,179 | B2 | 2/2008 | Baerlocher |
| 7,329,181 | B2 | 2/2008 | Hoshino et al. |
| 7,331,520 | B2 | 2/2008 | Silva et al. |
| 7,335,106 | B2 | 2/2008 | Johnson |
| 7,337,330 | B2 | 2/2008 | Gatto et al. |
| 7,341,522 | B2 | 3/2008 | Yamagishi |
| 7,351,146 | B2 | 4/2008 | Kaminkow |
| 7,416,485 | B2 | 8/2008 | Walker et al. |
| 7,419,428 | B2 | 9/2008 | Rowe |
| 7,467,999 | B2 | 12/2008 | Walker et al. |
| 7,477,889 | B2 | 1/2009 | Kim |
| 7,510,474 | B2 | 3/2009 | Carter, Sr. |

(56) References Cited

U.S. PATENT DOCUMENTS

| | | | |
|---|---|---|---|
| 7,545,522 | B1 | 6/2009 | Lou |
| 7,552,341 | B2 | 6/2009 | Chen et al. |
| 7,594,855 | B2 | 9/2009 | Meyerhofer |
| 7,611,409 | B2 | 11/2009 | Muir et al. |
| 7,618,319 | B2 | 11/2009 | Casey et al. |
| 7,619,585 | B2 | 11/2009 | Bell et al. |
| 7,644,861 | B2 | 1/2010 | Alderucci et al. |
| 7,686,687 | B2 | 3/2010 | Cannon et al. |
| 7,730,413 | B1 | 6/2010 | Engel et al. |
| 7,753,789 | B2 | 7/2010 | Walker et al. |
| 7,758,420 | B2 | 7/2010 | Saffari |
| 7,771,271 | B2 | 8/2010 | Walker et al. |
| 7,785,193 | B2 | 8/2010 | Paulsen et al. |
| 7,846,017 | B2 | 12/2010 | Walker et al. |
| 7,850,522 | B2 | 12/2010 | Walker et al. |
| 7,883,417 | B2 | 2/2011 | Bruzzese et al. |
| 7,918,734 | B2 | 4/2011 | Gould |
| 7,950,996 | B2 | 5/2011 | Nguyen et al. |
| 7,997,972 | B2 | 8/2011 | Nguyen et al. |
| 8,016,666 | B2 | 9/2011 | Angell et al. |
| 8,023,133 | B2 | 9/2011 | Kaneko |
| 8,029,351 | B2 | 10/2011 | Kosaka et al. |
| 8,038,527 | B2 | 10/2011 | Walker et al. |
| 8,070,590 | B2 | 12/2011 | Cannon et al. |
| 8,096,872 | B2 | 1/2012 | Walker et al. |
| 8,131,649 | B2 | 3/2012 | Yen et al. |
| 8,157,642 | B2 | 4/2012 | Paulsen |
| 8,192,276 | B2 | 6/2012 | Walker et al. |
| 8,220,019 | B2 | 7/2012 | Stearns et al. |
| 8,414,372 | B2 | 4/2013 | Cannon et al. |
| 8,419,526 | B1 | 4/2013 | Cannon et al. |
| 8,512,144 | B2 | 8/2013 | Johnson et al. |
| 8,678,916 | B2 | 3/2014 | Cannon et al. |
| 9,039,515 | B2 | 5/2015 | Iddings |
| 9,087,438 | B2 | 7/2015 | Aponte et al. |
| 10,275,984 | B2 * | 4/2019 | Roth ........................ G07F 17/32 |
| 2001/0004609 | A1 | 6/2001 | Walker et al. |
| 2001/0013681 | A1 | 8/2001 | Bruzzese et al. |
| 2001/0034268 | A1 | 10/2001 | Thomas et al. |
| 2001/0039204 | A1 | 11/2001 | Tanskanen |
| 2001/0044337 | A1 | 11/2001 | Rowe et al. |
| 2002/0020603 | A1 | 2/2002 | Jones et al. |
| 2002/0039923 | A1 | 4/2002 | Cannon et al. |
| 2002/0045472 | A1 | 4/2002 | Adams |
| 2002/0061778 | A1 | 5/2002 | Acres |
| 2002/0077182 | A1 | 6/2002 | Swanberg et al. |
| 2002/0082070 | A1 | 6/2002 | Macke et al. |
| 2002/0087641 | A1 | 7/2002 | Levosky |
| 2002/0090986 | A1 | 7/2002 | Cote et al. |
| 2002/0094869 | A1 | 7/2002 | Harkham |
| 2002/0107066 | A1 | 8/2002 | Seelig et al. |
| 2002/0111206 | A1 | 8/2002 | Van Baltz et al. |
| 2002/0111209 | A1 | 8/2002 | Walker et al. |
| 2002/0142825 | A1 | 10/2002 | Lark et al. |
| 2002/0142846 | A1 | 10/2002 | Paulsen |
| 2002/0145035 | A1 | 10/2002 | Jones |
| 2002/0147047 | A1 | 10/2002 | Letovsky et al. |
| 2002/0147049 | A1 | 10/2002 | Carter, Sr. |
| 2002/0151363 | A1 | 10/2002 | Letovsky et al. |
| 2002/0163570 | A1 | 11/2002 | Phillips |
| 2002/0169623 | A1 | 11/2002 | Call et al. |
| 2002/0173354 | A1 | 11/2002 | Winans et al. |
| 2002/0177483 | A1 | 11/2002 | Cannon |
| 2002/0183046 | A1 | 12/2002 | Joyce et al. |
| 2002/0183105 | A1 | 12/2002 | Cannon et al. |
| 2002/0194505 | A1 | 12/2002 | Muschenborn |
| 2002/0196342 | A1 | 12/2002 | Walker et al. |
| 2003/0003988 | A1 | 1/2003 | Walker et al. |
| 2003/0008707 | A1 | 1/2003 | Walker et al. |
| 2003/0027624 | A1 | 2/2003 | Gilmore et al. |
| 2003/0027632 | A1 | 2/2003 | Sines et al. |
| 2003/0032478 | A1 | 2/2003 | Takahama et al. |
| 2003/0032479 | A1 | 2/2003 | LeMay et al. |
| 2003/0032485 | A1 | 2/2003 | Cockerille et al. |
| 2003/0045354 | A1 | 3/2003 | Giobbi |
| 2003/0054868 | A1 | 3/2003 | Paulsen et al. |
| 2003/0054881 | A1 | 3/2003 | Hedrick et al. |
| 2003/0060264 | A1 | 3/2003 | Chilton et al. |
| 2003/0064771 | A1 | 4/2003 | Morrow et al. |
| 2003/0064801 | A1 | 4/2003 | Breckner |
| 2003/0064805 | A1 | 4/2003 | Wells |
| 2003/0069074 | A1 | 4/2003 | Jackson |
| 2003/0073497 | A1 | 4/2003 | Nelson |
| 2003/0074259 | A1 | 4/2003 | Slyman et al. |
| 2003/0083126 | A1 | 5/2003 | Paulsen |
| 2003/0083943 | A1 | 5/2003 | Adams et al. |
| 2003/0087690 | A1 | 5/2003 | Loose et al. |
| 2003/0092477 | A1 | 5/2003 | Luciano, Jr. et al. |
| 2003/0092486 | A1 | 5/2003 | Cannon |
| 2003/0104854 | A1 | 6/2003 | Cannon |
| 2003/0104865 | A1 | 6/2003 | Itkis et al. |
| 2003/0119576 | A1 | 6/2003 | McClintic et al. |
| 2003/0119581 | A1 | 6/2003 | Cannon et al. |
| 2003/0130028 | A1 | 7/2003 | Aida et al. |
| 2003/0137110 | A1 | 7/2003 | Huard et al. |
| 2003/0141359 | A1 | 7/2003 | Dymovsky et al. |
| 2003/0144052 | A1 | 7/2003 | Walker et al. |
| 2003/0144053 | A1 | 7/2003 | Michaelson |
| 2003/0148812 | A1 | 8/2003 | Paulsen et al. |
| 2003/0162582 | A1 | 8/2003 | Gordon |
| 2003/0162591 | A1 | 8/2003 | Nguyen et al. |
| 2003/0171145 | A1 | 9/2003 | Rowe |
| 2003/0172037 | A1 | 9/2003 | Jung et al. |
| 2003/0176214 | A1 | 9/2003 | Burak et al. |
| 2003/0186734 | A1 | 10/2003 | LeMay et al. |
| 2003/0186739 | A1 | 10/2003 | Paulsen et al. |
| 2003/0199321 | A1 | 10/2003 | Williams |
| 2003/0203756 | A1 | 10/2003 | Jackson |
| 2003/0222876 | A1 | 12/2003 | Giemborek et al. |
| 2003/0224852 | A1 | 12/2003 | Walker et al. |
| 2003/0228900 | A1 | 12/2003 | Yamagishi |
| 2003/0236114 | A1 | 12/2003 | Griswold et al. |
| 2004/0002379 | A1 | 1/2004 | Parrott et al. |
| 2004/0009813 | A1 | 1/2004 | Wind |
| 2004/0014514 | A1 | 1/2004 | Yacenda |
| 2004/0016797 | A1 | 1/2004 | Jones et al. |
| 2004/0023714 | A1 | 2/2004 | Asdale |
| 2004/0023721 | A1 | 2/2004 | Giobbi |
| 2004/0029636 | A1 | 2/2004 | Wells |
| 2004/0033831 | A1 | 2/2004 | Tarantino |
| 2004/0039635 | A1 | 2/2004 | Linde et al. |
| 2004/0043814 | A1 | 3/2004 | Angell et al. |
| 2004/0048671 | A1 | 3/2004 | Rowe |
| 2004/0063490 | A1 | 4/2004 | Okada |
| 2004/0063492 | A1 | 4/2004 | Baerlocher et al. |
| 2004/0066475 | A1 | 4/2004 | Searle |
| 2004/0070146 | A1 | 4/2004 | Snow |
| 2004/0084843 | A1 | 5/2004 | Snow |
| 2004/0085293 | A1 | 5/2004 | Soper et al. |
| 2004/0087360 | A1 | 5/2004 | Chamberlain et al. |
| 2004/0090003 | A1 | 5/2004 | Snow |
| 2004/0090005 | A1 | 5/2004 | Snow |
| 2004/0103444 | A1 | 5/2004 | Weinberg et al. |
| 2004/0106454 | A1 | 6/2004 | Walker et al. |
| 2004/0110557 | A1 | 6/2004 | Rowe |
| 2004/0116175 | A1 | 6/2004 | Aida |
| 2004/0116178 | A1 | 6/2004 | Okada |
| 2004/0117484 | A1 | 6/2004 | Singer et al. |
| 2004/0127277 | A1 | 7/2004 | Walker et al. |
| 2004/0127284 | A1 | 7/2004 | Walker et al. |
| 2004/0129773 | A1 | 7/2004 | Lute, Jr. et al. |
| 2004/0147303 | A1 | 7/2004 | Imura et al. |
| 2004/0147314 | A1 | 7/2004 | LeMay et al. |
| 2004/0150162 | A1 | 8/2004 | Okada |
| 2004/0162146 | A1 | 8/2004 | Ooto |
| 2004/0166925 | A1 | 8/2004 | Emori et al. |
| 2004/0171423 | A1 | 9/2004 | Silva et al. |
| 2004/0180712 | A1 | 9/2004 | Forman et al. |
| 2004/0180721 | A1 | 9/2004 | Rowe |
| 2004/0183972 | A1 | 9/2004 | Bell |
| 2004/0185935 | A1 | 9/2004 | Yamagishi |
| 2004/0190042 | A1 | 9/2004 | Ferlitsch et al. |
| 2004/0192430 | A1 | 9/2004 | Burak et al. |
| 2004/0192434 | A1 | 9/2004 | Walker et al. |

(56) References Cited

U.S. PATENT DOCUMENTS

| | | | |
|---|---|---|---|
| 2004/0198485 | A1 | 10/2004 | Loose |
| 2004/0199284 | A1 | 10/2004 | Hara |
| 2004/0207154 | A1 | 10/2004 | Okada |
| 2004/0208126 | A1 | 10/2004 | Wassew et al. |
| 2004/0209666 | A1 | 10/2004 | Okada et al. |
| 2004/0209667 | A1 | 10/2004 | Emori et al. |
| 2004/0209668 | A1 | 10/2004 | Okada |
| 2004/0209671 | A1 | 10/2004 | Okada |
| 2004/0209678 | A1 | 10/2004 | Okada |
| 2004/0209683 | A1 | 10/2004 | Okada |
| 2004/0209690 | A1 | 10/2004 | Bruzzese et al. |
| 2004/0214635 | A1 | 10/2004 | Okada |
| 2004/0214637 | A1 | 10/2004 | Nonaka |
| 2004/0219968 | A1 | 11/2004 | Fiden et al. |
| 2004/0224747 | A1 | 11/2004 | Okada |
| 2004/0225565 | A1 | 11/2004 | Selman |
| 2004/0227293 | A1 | 11/2004 | Piccoli et al. |
| 2004/0233663 | A1 | 11/2004 | Emslie et al. |
| 2004/0235542 | A1 | 11/2004 | Stronach et al. |
| 2004/0239582 | A1 | 12/2004 | Seymour |
| 2004/0254010 | A1 | 12/2004 | Fine |
| 2004/0259640 | A1 | 12/2004 | Gentles et al. |
| 2004/0266395 | A1 | 12/2004 | Pailles et al. |
| 2005/0014554 | A1 | 1/2005 | Walker et al. |
| 2005/0020348 | A1 | 1/2005 | Thomas et al. |
| 2005/0020354 | A1 | 1/2005 | Nguyen et al. |
| 2005/0020358 | A1 | 1/2005 | Cram |
| 2005/0032571 | A1 | 2/2005 | Asonuma |
| 2005/0037843 | A1 | 2/2005 | Wells et al. |
| 2005/0043086 | A1 | 2/2005 | Schneider |
| 2005/0049032 | A1 | 3/2005 | Kobayashi |
| 2005/0049046 | A1 | 3/2005 | Kobayashi |
| 2005/0049049 | A1 | 3/2005 | Griswold et al. |
| 2005/0054417 | A1 | 3/2005 | Parrott |
| 2005/0054438 | A1 | 3/2005 | Rothschild et al. |
| 2005/0059480 | A1 | 3/2005 | Soukup et al. |
| 2005/0059485 | A1 | 3/2005 | Paulsen et al. |
| 2005/0059494 | A1 | 3/2005 | Kammler |
| 2005/0062410 | A1 | 3/2005 | Bell et al. |
| 2005/0063055 | A1 | 3/2005 | Engel |
| 2005/0070257 | A1 | 3/2005 | Saarinen et al. |
| 2005/0076242 | A1 | 4/2005 | Breuer |
| 2005/0079913 | A1 | 4/2005 | Inamura |
| 2005/0085288 | A1 | 4/2005 | Schugar et al. |
| 2005/0085292 | A1 | 4/2005 | Inamura |
| 2005/0101383 | A1 | 5/2005 | Wells |
| 2005/0119052 | A1 | 6/2005 | Russell et al. |
| 2005/0130728 | A1 | 6/2005 | Nguyen et al. |
| 2005/0153772 | A1 | 7/2005 | Griswold et al. |
| 2005/0153775 | A1 | 7/2005 | Griswold et al. |
| 2005/0153776 | A1 | 7/2005 | LeMay et al. |
| 2005/0164762 | A1 | 7/2005 | Smith et al. |
| 2005/0192090 | A1 | 9/2005 | Muir et al. |
| 2005/0192099 | A1 | 9/2005 | Nguyen et al. |
| 2005/0193269 | A1 | 9/2005 | Haswell et al. |
| 2005/0206582 | A1 | 9/2005 | Bell et al. |
| 2005/0208994 | A1 | 9/2005 | Berman |
| 2005/0215311 | A1 | 9/2005 | Hornik et al. |
| 2005/0227770 | A1 | 10/2005 | Papulov |
| 2005/0233799 | A1 | 10/2005 | LeMay et al. |
| 2005/0233803 | A1 | 10/2005 | Yang |
| 2005/0239530 | A1 | 10/2005 | Walker et al. |
| 2005/0239539 | A1 | 10/2005 | Inamura |
| 2005/0239542 | A1 | 10/2005 | Olsen |
| 2005/0240484 | A1 | 10/2005 | Yan et al. |
| 2005/0255911 | A1 | 11/2005 | Nguyen et al. |
| 2005/0266912 | A1 | 12/2005 | Sekiguchi |
| 2005/0282628 | A1 | 12/2005 | Beatty et al. |
| 2005/0282638 | A1 | 12/2005 | Rowe |
| 2005/0285337 | A1 | 12/2005 | Durham et al. |
| 2005/0287852 | A1 | 12/2005 | Sugawara et al. |
| 2006/0009273 | A2 | 1/2006 | Moshal |
| 2006/0018450 | A1 | 1/2006 | Sandberg-Diment |
| 2006/0019743 | A1 | 1/2006 | Roemer |
| 2006/0025206 | A1 | 2/2006 | Walker et al. |
| 2006/0025222 | A1 | 2/2006 | Sekine |
| 2006/0035707 | A1 | 2/2006 | Nguyen et al. |
| 2006/0040732 | A1 | 2/2006 | Baerlocher et al. |
| 2006/0040741 | A1 | 2/2006 | Griswold et al. |
| 2006/0041586 | A1 | 2/2006 | Nassef, Jr. |
| 2006/0046823 | A1 | 3/2006 | Kaminkow et al. |
| 2006/0046834 | A1 | 3/2006 | Sekine |
| 2006/0046842 | A1 | 3/2006 | Mattice et al. |
| 2006/0046855 | A1 | 3/2006 | Nguyen et al. |
| 2006/0049624 | A1 | 3/2006 | Brosnan et al. |
| 2006/0063581 | A1 | 3/2006 | Harris et al. |
| 2006/0068898 | A1 | 3/2006 | Maya |
| 2006/0073882 | A1 | 4/2006 | Rozkin et al. |
| 2006/0079333 | A1 | 4/2006 | Morrow et al. |
| 2006/0089174 | A1 | 4/2006 | Twerdahl |
| 2006/0089194 | A1 | 4/2006 | Joshi et al. |
| 2006/0094508 | A1 | 5/2006 | D'Amico et al. |
| 2006/0100014 | A1 | 5/2006 | Griswold et al. |
| 2006/0103951 | A1 | 5/2006 | Bell et al. |
| 2006/0105837 | A1 | 5/2006 | Walker et al. |
| 2006/0105841 | A1 | 5/2006 | Rom et al. |
| 2006/0125745 | A1 | 6/2006 | Evanicky |
| 2006/0128457 | A1 | 6/2006 | Cannon |
| 2006/0135255 | A1 | 6/2006 | Roth |
| 2006/0143085 | A1 | 6/2006 | Adams et al. |
| 2006/0154729 | A1 | 7/2006 | LeMay et al. |
| 2006/0160621 | A1 | 7/2006 | Rowe et al. |
| 2006/0165060 | A1 | 7/2006 | Dua |
| 2006/0166727 | A1 | 7/2006 | Burak |
| 2006/0166732 | A1 | 7/2006 | Lechner et al. |
| 2006/0166741 | A1 | 7/2006 | Boyd et al. |
| 2006/0173781 | A1 | 8/2006 | Donner |
| 2006/0184626 | A1 | 8/2006 | Agapi et al. |
| 2006/0189382 | A1 | 8/2006 | Muir et al. |
| 2006/0190482 | A1 | 8/2006 | Kishan et al. |
| 2006/0191177 | A1 | 8/2006 | Engel |
| 2006/0205484 | A1 | 9/2006 | Nicastro |
| 2006/0211473 | A1 | 9/2006 | Walker et al. |
| 2006/0217202 | A1 | 9/2006 | Burke et al. |
| 2006/0218029 | A1 | 9/2006 | Chin |
| 2006/0223627 | A1 | 10/2006 | Nozaki et al. |
| 2006/0226598 | A1 | 10/2006 | Walker et al. |
| 2006/0246981 | A1 | 11/2006 | Walker et al. |
| 2006/0247010 | A1 | 11/2006 | Gagner |
| 2006/0247037 | A1 | 11/2006 | Park |
| 2006/0264256 | A1 | 11/2006 | Gagner et al. |
| 2006/0264257 | A1 | 11/2006 | Jaffe et al. |
| 2006/0266598 | A1 | 11/2006 | Baumgartner et al. |
| 2006/0271433 | A1 | 11/2006 | Hughes |
| 2006/0279781 | A1 | 12/2006 | Kaneko |
| 2006/0281554 | A1 | 12/2006 | Gatto et al. |
| 2006/0282855 | A1 | 12/2006 | Margulis |
| 2006/0284574 | A1 | 12/2006 | Emslie et al. |
| 2006/0287072 | A1 | 12/2006 | Walker et al. |
| 2006/0287098 | A1 | 12/2006 | Morrow et al. |
| 2006/0290594 | A1 | 12/2006 | Engel et al. |
| 2007/0004510 | A1 | 1/2007 | Underdahl et al. |
| 2007/0004513 | A1 | 1/2007 | Wells et al. |
| 2007/0004519 | A1 | 1/2007 | Swart et al. |
| 2007/0010315 | A1 | 1/2007 | Hein |
| 2007/0015569 | A1 | 1/2007 | Norton et al. |
| 2007/0017979 | A1 | 1/2007 | Wu et al. |
| 2007/0021198 | A1 | 1/2007 | Muir et al. |
| 2007/0024002 | A1 | 2/2007 | McMain et al. |
| 2007/0032288 | A1 | 2/2007 | Nelson et al. |
| 2007/0043616 | A1 | 2/2007 | Kutaragi et al. |
| 2007/0054726 | A1 | 3/2007 | Muir et al. |
| 2007/0060302 | A1 | 3/2007 | Fabbri |
| 2007/0060314 | A1 | 3/2007 | Baerlocher et al. |
| 2007/0060317 | A1 | 3/2007 | Martin |
| 2007/0060321 | A1 | 3/2007 | Vasquez et al. |
| 2007/0060372 | A1 | 3/2007 | Yamagishi et al. |
| 2007/0102877 | A1 | 5/2007 | Personius et al. |
| 2007/0117608 | A1 | 5/2007 | Roper et al. |
| 2007/0117623 | A1 | 5/2007 | Nelson et al. |
| 2007/0129150 | A1 | 6/2007 | Crowder, Jr. et al. |
| 2007/0155482 | A1 | 7/2007 | Walker et al. |
| 2007/0155483 | A1 | 7/2007 | Walker et al. |
| 2007/0155484 | A1 | 7/2007 | Walker et al. |

(56) References Cited

U.S. PATENT DOCUMENTS

| | | | |
|---|---|---|---|
| 2007/0159301 | A1 | 7/2007 | Hirt et al. |
| 2007/0180400 | A1 | 8/2007 | Zotov et al. |
| 2007/0190494 | A1 | 8/2007 | Rosenberg |
| 2007/0191088 | A1 | 8/2007 | Breckner et al. |
| 2007/0218971 | A1 | 9/2007 | Berube |
| 2007/0218985 | A1 | 9/2007 | Okada |
| 2007/0218991 | A1 | 9/2007 | Okada |
| 2007/0238505 | A1 | 10/2007 | Okada |
| 2007/0243925 | A1 | 10/2007 | LeMay et al. |
| 2007/0243928 | A1 | 10/2007 | Iddings |
| 2007/0243934 | A1 | 10/2007 | Little et al. |
| 2007/0273097 | A1 | 11/2007 | Kirkutis |
| 2007/0293293 | A1 | 12/2007 | Baerlocher et al. |
| 2008/0008188 | A1 | 1/2008 | Buga et al. |
| 2008/0009344 | A1 | 1/2008 | Graham et al. |
| 2008/0020816 | A1 | 1/2008 | Griswold et al. |
| 2008/0020839 | A1 | 1/2008 | Wells et al. |
| 2008/0020840 | A1 | 1/2008 | Wells et al. |
| 2008/0020841 | A1 | 1/2008 | Wells et al. |
| 2008/0026816 | A1 | 1/2008 | Sammon et al. |
| 2008/0026823 | A1 | 1/2008 | Wolf et al. |
| 2008/0026844 | A1 | 1/2008 | Wells |
| 2008/0067745 | A1 | 3/2008 | Wikstrom |
| 2008/0076496 | A1 | 3/2008 | Baerlocher et al. |
| 2008/0076531 | A1 | 3/2008 | Baerlocher et al. |
| 2008/0076532 | A1 | 3/2008 | Graham et al. |
| 2008/0076542 | A1 | 3/2008 | Iddings et al. |
| 2008/0076574 | A1 | 3/2008 | Okada |
| 2008/0096655 | A1 | 4/2008 | Rasmussen et al. |
| 2008/0108425 | A1 | 5/2008 | Oberberger |
| 2008/0113747 | A1 | 5/2008 | Williams et al. |
| 2008/0119283 | A1 | 5/2008 | Baerlocher |
| 2008/0123026 | A1 | 5/2008 | Kwag et al. |
| 2008/0125219 | A1 | 5/2008 | Williams et al. |
| 2008/0146344 | A1 | 6/2008 | Rowe et al. |
| 2008/0213026 | A1 | 9/2008 | Grabiec et al. |
| 2008/0305862 | A1 | 12/2008 | Walker et al. |
| 2009/0098943 | A1 | 4/2009 | Weber et al. |
| 2009/0104954 | A1 | 4/2009 | Weber et al. |
| 2009/0125429 | A1 | 5/2009 | Takayama |
| 2009/0156303 | A1 | 6/2009 | Kiely et al. |
| 2009/0233705 | A1 | 9/2009 | LeMay et al. |
| 2010/0105454 | A1 | 4/2010 | Weber et al. |
| 2010/0219234 | A1 | 9/2010 | Forbes |
| 2010/0240455 | A1 | 9/2010 | Gagner et al. |
| 2010/0304855 | A1 | 12/2010 | Acres |
| 2011/0003642 | A1 | 1/2011 | Russell et al. |
| 2011/0098104 | A1 | 4/2011 | Meyerhofer |
| 2014/0221099 | A1 | 8/2014 | Johnson et al. |
| 2015/0339888 | A1 | 11/2015 | Hong |

FOREIGN PATENT DOCUMENTS

| | | |
|---|---|---|
| AU | 2002310115 | 6/2006 |
| EP | 0454423 | 10/1991 |
| EP | 0484103 | 5/1992 |
| EP | 0727245 | 8/1996 |
| EP | 0769769 | 4/1997 |
| EP | 0997857 | 5/2000 |
| EP | 1195184 | 4/2002 |
| EP | 1255234 | 11/2002 |
| EP | 1260928 | 11/2002 |
| EP | 1282088 | 2/2003 |
| EP | 1462152 | 9/2004 |
| EP | 1492063 | 12/2004 |
| EP | 1524617 | 4/2005 |
| GB | 1242298 | 8/1971 |
| GB | 1464896 | 2/1977 |
| GB | 1559496 | 1/1980 |
| GB | 2120506 | 11/1983 |
| GB | 2137392 | 10/1984 |
| GB | 2226436 | 6/1999 |
| WO | WO9519595 | 7/1995 |
| WO | WO9524795 | 9/1995 |
| WO | WO9609102 | 3/1996 |
| WO | WO9800210 | 1/1998 |
| WO | WO9851384 | 11/1998 |
| WO | WO1998052665 | 11/1998 |
| WO | WO1999042889 | 8/1999 |
| WO | WO1999044095 | 9/1999 |
| WO | WO0012186 | 3/2000 |
| WO | WO0020082 | 4/2000 |
| WO | WO2001009664 | 2/2001 |
| WO | WO2001015127 | 3/2001 |
| WO | WO2001015128 | 3/2001 |
| WO | WO2001015132 | 3/2001 |
| WO | WO2001072387 | 10/2001 |
| WO | WO2002021467 | 3/2002 |
| WO | WO2002073501 | 9/2002 |
| WO | WO02096528 | 12/2002 |
| WO | WO02099760 | 12/2002 |
| WO | WO2003023647 | 3/2003 |
| WO | WO2003039699 | 5/2003 |
| WO | WO03049053 | 6/2003 |
| WO | WO2004001486 | 12/2003 |
| WO | WO2004102520 | 11/2004 |
| WO | WO2005010834 | 2/2005 |
| WO | WO2006033986 | 3/2006 |
| WO | WO2006034192 | 3/2006 |
| WO | WO2006038819 | 4/2006 |
| WO | WO2006039132 | 4/2006 |
| WO | WO2006093146 | 9/2006 |
| WO | WO2007032916 | 3/2007 |
| WO | WO2007040413 | 4/2007 |
| WO | WO2007117418 | 10/2007 |
| WO | WO2007120444 | 10/2007 |
| WO | WO2007120450 | 10/2007 |
| WO | WO2008061068 | 5/2008 |
| WO | WO2009009269 | 1/2009 |
| WO | WO2009036445 | 3/2009 |
| WO | WO2009061651 | 5/2009 |
| WO | WO2009108400 | 9/2009 |
| WO | WO2009140096 | 11/2009 |
| WO | WO2009143274 | 11/2009 |
| WO | WO2010056418 | 5/2010 |
| WO | WO2010120451 | 10/2010 |
| WO | WO2010132206 | 11/2010 |

* cited by examiner

1000

GAMING SYSTEM AND METHOD FOR PLACING AND REDEEMING SPORTS BETS

PRIORITY CLAIM

This application is a continuation of, claims priority to and the benefit of U.S. patent application Ser. No. 16/993,589, filed on Aug. 14, 2020, which is a continuation of, claims priority to and the benefit of U.S. patent application Ser. No. 16/038,942, filed on Jul. 18, 2018, which is a continuation of, claims priority to and the benefit of U.S. patent application Ser. No. 14/823,753, filed on Aug. 11, 2015, the entire contents of which are each incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a primary or base wager to activate the primary or base game. In many of these gaming machines, the award is based on the player obtaining a winning symbol or symbol combination and on the amount of the primary or base wager (e.g., the higher the wager, the higher the award). Symbols or symbol combinations which are less likely to occur usually provide higher awards.

Side bets or side wagers are also known in gaming machines. Side bets enable a player to place one or more wagers on one or more aspects of a player's gaming experience which is in addition to any primary or base game wager. In one form, a side bet is directed to a specific feature or function that the player desires, such as a side wager on a bonus game, a side wager to be eligible to win a progressive award or a side wager on the result of another game being played by another player at another gaming machine.

Sports betting is also known. In general, sports betting is the activity of predicting results of sporting events and placing a wager on the outcome of such sporting events. According to The Statistics Portal, the total amount wagered on sporting events at Nevada sports books in 2012 was $3,450,000,000.00. Despite this market, many gaming machine players are not involved in the sports betting experience. Some players find it a nuisance of having to place such sports bets and redeem any winnings for such sports bets at a designated location in the gaming establishment (i.e., a casino's sports book). Some players have a difficult time remembering that a sporting event is currently taking place and/or do not want to interrupt their gaming machine wagering session to place a sports bet at the casino's sports book.

There is a continuing need to provide new and different gaming systems as well as new and different ways to provide awards to players utilizing sports bets.

SUMMARY

The present disclosure relates generally to gaming systems and methods for placing one or more sports bets at an electronic gaming machine ("EGM") and for redeeming any winnings for one or more placed sports bet at an EGM.

In various embodiments, the gaming system disclosed herein informs a player at an EGM about the status of various sporting events (i.e., upcoming sporting events and in-progress sporting events) and any available sports bets which may be placed on such sporting events. In certain embodiments, this sporting event and sporting event wagering information is displayed to the player via one or more service windows of the EGM. In certain embodiments, this sporting event and sporting event wagering information is displayed to the player as one or more overlay images. Such broadcasting of information pertaining to the various sporting events and sports bets available to be placed partially mimics the experience certain players associate with a gaming establishment's sports book (without having to leave the EGM) and further assists these players in providing them information they would otherwise not remember.

In addition to keeping players informed regarding various sporting events, the gaming system enables a player to place one or more sports bets directly at the EGM without otherwise interrupting the player's gaming session. In various embodiments, placing a sports bet directly at the EGM includes utilizing the credit balance of the EGM to fund the placed sports bet. In various embodiments, placing a sports bet directly at the EGM includes the EGM issuing a ticket to the player, wherein the ticket is compatible with a gaming establishment's sports book. That is, the gaming system disclosed herein provides that an EGM issued ticket associated with the placement of a winning sports bet may be redeemed at a gaming establishment's sports book as if the winning sports bet ticket was issued directly by the gaming establishment's sport book. Such a configuration of enabling a player to employ funds currently on the EGM to place one or more sports bets and further enabling the player to redeem any EGM issued winning sports bet tickets provides players with increased wagering opportunities and increased excitement in potentially winning one or more additional awards during their gaming experience.

In addition or alternative to enabling a player to place one or more sports bets directly at the EGM without otherwise interrupting the player's gaming session, in various embodiments, the gaming system enables a player to redeem one or more sports bet tickets directly at the EGM. This redemption occurs regardless of whether a winning sports bet ticket was issued by the gaming establishment's sports book (in which case the gaming system invalidates or otherwise voids the winning gaming establishment sports book issued ticket from being redeemed at the gaming establishment sports book) or by the EGM (as described above). In one such embodiment, the gaming system enables a player to redeem a winning gaming establishment sports book issued ticket (or an EGM issued sports bet ticket redeemable at the gaming establishment's sports book) to fund a credit balance of the EGM with a quantity of credits corresponding to the amount associated with the winning sports bet ticket. In another such embodiment, the gaming system enables a player to redeem a winning gaming establishment sports issued ticket (or an EGM issued sports bet ticket redeemable at the gaming establishment's sports book) in exchange for a cashout ticket issued by the EGM. In this embodiment, the cashout ticket is cashable at a cashout kiosk (where EGM cashout tickets are cashed) or may be used to establish a credit balance at another EGM. Such a configuration of enabling a player to redeem a winning sports bet ticket directly at the EGM provides players with the convenience of continuing their gaming session at the EGM without having to interrupt their gaming session to visit the gaming establishment's sports book.

Additional features and advantages are described herein, and will be apparent from the following Detailed Description and the figures.

DETAILED DESCRIPTION

Figure 1A:
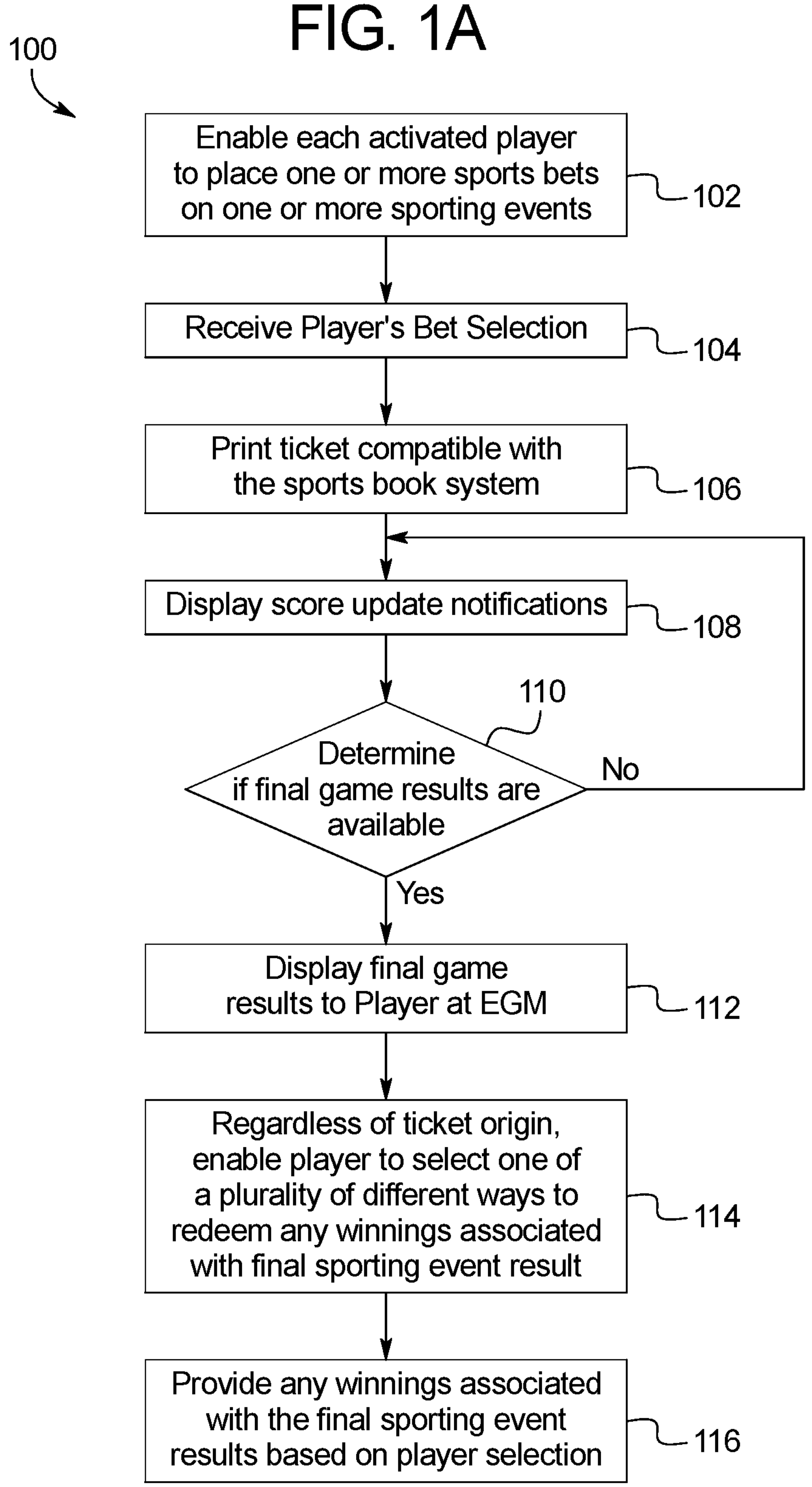
FIGS. 1A, 1B, 1C, 1D, and 1E are flow charts of an example process for operating a gaming system of the present disclosure providing a sports betting feature as disclosed herein.

Sports Betting at an Electronic Gaming Machine

In various embodiments, the gaming system disclosed herein enables players to place one or more sports bets at an electronic gaming machine ("EGM"). The gaming system disclosed herein further enables players to redeem any winnings for one or more placed sports bet at an EGM.

It should be appreciated that while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

In certain embodiments, the gaming system enables a player to place one or more sports bets directly at the EGM without otherwise interrupting the player's gaming session. In various embodiments, placing a sports bet directly at the EGM includes utilizing the credit balance of the EGM to fund the placed sports bet. In various embodiments, placing a sports bet directly at the EGM includes the EGM issuing a ticket to the player, wherein the ticket is compatible with a gaming establishment's sports book. That is, the gaming system disclosed herein provides that an EGM issued ticket associated with the placement of a winning sports bet may be redeemed at a gaming establishment's sports book as if the winning sports bet ticket was issued directly by the gaming establishment's sport book. Such a configuration of enabling a player to employ funds currently on the EGM to place one or more sports bets and further enabling the player to redeem any EGM issued winning sports bet tickets provides players with increased wagering opportunities and increased excitement in potentially winning one or more additional awards during their gaming experience.

In certain additional or alternative embodiments, the gaming system enables a player to redeem one or more sports bet tickets directly at the EGM. This redemption occurs regardless of whether a winning sports bet ticket was issued by the gaming establishment's sports book (in which case the gaming system invalidates or otherwise voids the winning gaming establishment sports book issued ticket from being redeemed at the gaming establishment sports book) or by the EGM (as described above). In one such embodiment, the gaming system enables a player to redeem a winning gaming establishment sports book issued ticket (or an EGM issued sports bet ticket redeemable at the gaming establishment's sports book) to fund a credit balance of the EGM with a quantity of credits corresponding to the amount associated with the winning sports bet ticket. In another such embodiment, the gaming system enables a player to redeem a winning gaming establishment sports issued ticket (or an EGM issued sports bet ticket redeemable at the gaming establishment's sports book) in exchange for a cashout ticket issued by the EGM. In this embodiment, the cashout ticket is cashable at a cashout kiosk (where EGM cashout tickets are cashed) or may be used to establish a credit balance at another EGM. Such a configuration of enabling a player to redeem a winning sports bet ticket directly at the EGM provides players with the convenience of continuing their gaming session at the EGM without having to interrupt their gaming session to visit the gaming establishment's sports book FIGS. 1A, 1B, 1C, 1D, and 1E illustrate flowcharts of various embodiments of a process for operating a gaming system disclosed herein. In one embodiment, these processes are embodied in one or more software programs stored in one or more memories and executed by one or more processors or servers. Although these processes are described with reference to the flowcharts illustrated in FIGS. 1A, 1B, 1C, 1D, and 1E, it should be appreciated that many other methods of performing the acts associated with these processes may be used. For example, the order of certain steps described may be changed, or certain steps described may be optional.

More specifically, referring now to process 100 of FIG. 1A, in operation of this embodiment, the gaming system enables each activated player to place one or more sports bets on one or more sporting events, as indicated in block 102. More specifically and as will be described in greater detail below with respect to FIG. 1B, the gaming system determines whether a player is activated for the sports betting feature from the player's player card. An activated player is a player that has been approved for the sports betting feature. Once the gaming system determines that a player is activated for the sports betting feature, the gaming system enables the player to place one or more sports bets directly at the EGM without otherwise interrupting the player's gaming session.

In certain embodiments, the gaming system enables the player to select the sports betting feature directly from a theme selection menu. In certain embodiments, as described in greater detail below with respect to FIG. 1C, the gaming system informs a player at an EGM about the status of various sporting events (i.e., upcoming sporting events and in-progress sporting events) and any available sports bets which may be placed on such sporting events during a player's game session. Such broadcasting of information pertaining to the various sporting events and sports bets available to be placed partially mimics the experience certain players associate with a gaming establishment's sports book (without having to leave the EGM) and further assists these players in providing them information they would otherwise not remember.

After the gaming system enables the activated player to place a sports bet, as indicated by block 102, the gaming system receives the player's sports bet selection at the EGM, as indicated by block 104. As described in greater detail below with respect to FIG. 1D, to receive the player's sports bet selection, the gaming system enables the player to choose the sports bet and the sports bet amount. In various embodiments, placing a sports bet directly at the EGM includes utilizing the credit balance of the EGM to fund the placed sports bet. Following the placement of a sports bet, the gaming system prints a ticket compatible with the sports book system as indicated by block 106.

After the gaming system prints a ticket for the player's placed sports bet, the gaming system displays score update notifications as indicated by block 108. More specifically and as described in greater detail below with respect to FIG. 1E, the gaming system receives score update notifications for the player associated with the received player card at that EGM and the gaming system displays the score update notifications to the activated player at the EGM where the player is active. It should be appreciated that even if the player moves to a different EGM from where the player placed the bet, the gaming system displays score update notifications to the player if the player is active at an EGM. As such, the player does not have to keep up with events that the player placed bets on because the gaming system provides notifications for the player.

Following the display of zero, one or more score updates, the gaming system determines whether the final game results are available as indicated by diamond 110. If the gaming system determines the final game results are not available, the gaming system continues to display score update notifications to the player at the EGM where the player inserted the player's player card.

If the gaming system determines that final game results are available, the gaming system displays the final game results to the player at the EGM where the player is playing as indicated by block 112.

Following the display of the final game result and regardless of the ticket origin, the gaming system enables the player to select one of a plurality of different ways to redeem any winnings associated with the final sport event results, as indicated by block 114. That is, the gaming system provides that an EGM issued ticket associated with the placement of a winning sports bet may be redeemed at a gaming establishment's sports book as if the winning sports bet ticket was issued directly by the gaming establishment's sport book. If a winning ticket is redeemed, the gaming system provides any winnings associated with the final sporting event results based on player selection, as indicated by block 116.

It should be appreciated that such a configuration of enabling a player to employ funds currently on the EGM to place one or more sports bets and further enabling the player to redeem any EGM issued winning sports bet tickets provides players with increased wagering opportunities and increased excitement in potentially winning one or more additional awards during their gaming experience.

Sports Betting Feature Activation

Figure 1B:
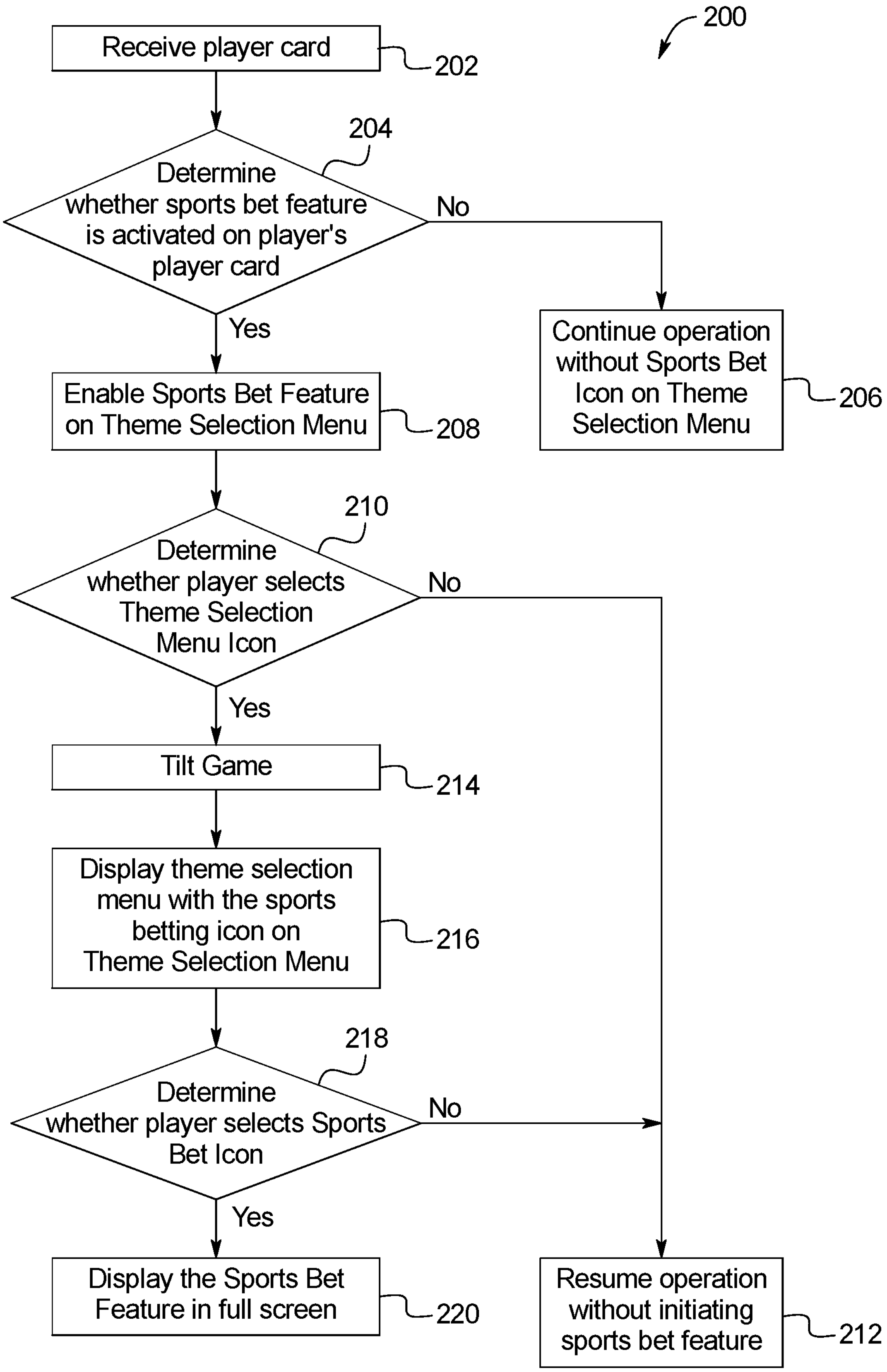

Referring now to FIG. 1B, which illustrates a flowchart of an example embodiment of a process 200 for displaying the sports betting feature to an activated player.

In operation of this embodiment, prior to a enabling a player to place a sports bet (block 102 of FIG. 1A), the gaming system receives a player card that the player inserts into the EGM, as indicated by block 202. The gaming system determines whether the sports betting feature is activated on the player's player card, as indicated by diamond 204. In certain embodiments, a gaming establishment activates the sports betting feature on a player's player card. The gaming establishment determines which players to activate based on an application. The gaming establishment determines the information inside the application and the method of submittal based on the regulations of each jurisdiction.

Figure 2A:
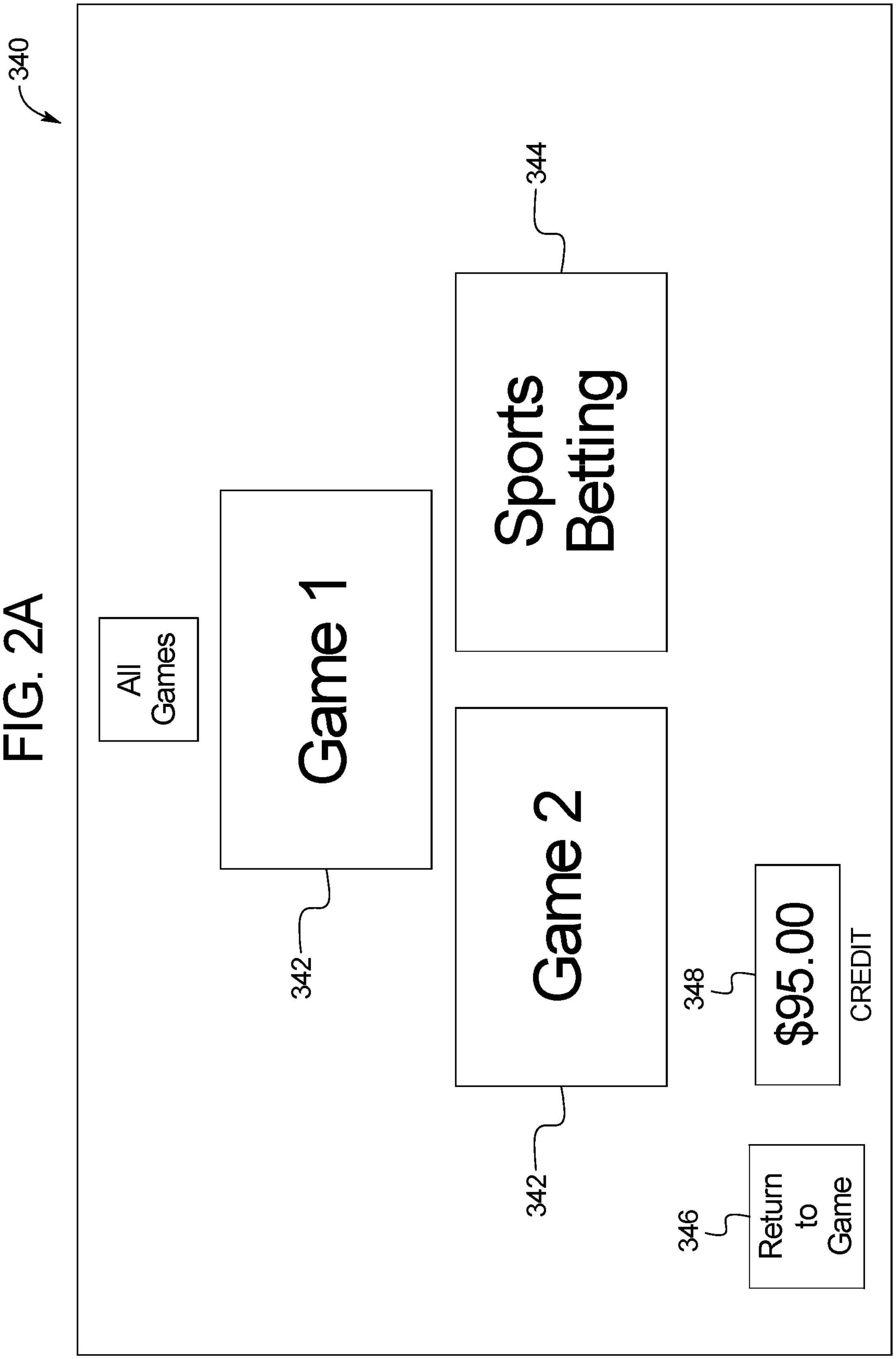
FIGS. 2A, 2B, 2C, and 2D are screen shots of one example embodiment of the gaming system of the present disclosure providing a sports betting feature as disclosed herein.

After determining whether the sports bet feature is activated on a player's player card, the gaming system enables the sports betting feature on the theme selection menu for the activated player, as indicated by block 208. That is, the gaming system enables the sports betting feature on the theme selection menu so that an activated player may go to the theme selection menu and select the sports betting feature. FIG. 2A illustrates a screen shot of a theme selection menu 340 for an activated player according to one example embodiment. The gaming system displays selectable icons for various games 342, and a selectable icon for the sports betting feature 344. In certain embodiments, the gaming system also displays the player's current credits 348. As such, the gaming system enables an activated player to manually select the sports betting feature directly at the EGM just as the player would select any other game.

If the sports betting feature is not activated on the player's player card, the gaming system continues operation without the sports betting icon on the theme selection menu of the EGM as indicated by block 206. That is, for a player that is not activated, the gaming system does not display the sports betting icon on the theme selection menu.

In certain additional or alternative embodiments, if the sports betting feature is not activated on the player's player card, the gaming system enables the player to request activation of the sports betting feature at the EGM. More specifically, the gaming system displays a message to the player indicating that the sports betting feature has not been activated on the player's player card and presents the player with the option to activate the feature. If the player selects to activate the sports betting feature, the gaming system notifies gaming establishment personnel and resumes operation in a non-sports betting enabled mode.

Returning to FIG. 1B, after enabling the sports betting feature, the gaming system determines whether the player selects the theme selection menu icon, as indicated by diamond 210. If the gaming system determines that the player selects the theme selection menu, the gaming system places the current game in a tilt state, as indicated by block 214. The tilt state ensures that game play does not continue while the game cannot be seen. The gaming system displays the theme selection menu with the sports betting icon, as indicated by block 216 and as depicted in FIG. 2A.

After the gaming system displays the theme selection menu, the gaming system determines whether the player selects the sports betting icon, as indicated by diamond 218. If the player does not select the sports betting icon, the gaming system resumes operation without initiating the sports bet feature, as indicated by block 212. In certain embodiments, the gaming system displays a "RETURN TO GAME" icon 346 for the player to select to return to the original game that is in tilt state.

If the player selects the sports betting icon, the gaming system displays the sports betting feature in full screen, as indicated by block 220. As described in greater detail below, this spawns a full screen window with all of the information about current sports bets.

Such a configuration enables the player to manually select the sports betting feature at any EGM and enables players to relatively conveniently and relatively easily place a sports bet without having to go to a designated location. For players that find it a nuisance of having to place such sports bets at a designated location and for players that have a difficult time remembering that a sporting event is currently taking place and/or do not want to interrupt their EGM wagering session to place a sports bet at the gaming establishment's sports book, this configuration enables the player to select the sports betting feature directly from the theme selection menu just as the player would select any other game.

It should be appreciated that in various embodiments, the gaming system displays the sports betting feature to activated players. Various jurisdictions provide different regulations for sports betting. Accordingly, each gaming establishment may customize the application process to approve players for the sports betting feature. Once approved, the players are activated for the sports betting feature on their player cards so that the activation is universally determinable at all EGMs where the player inserts the player card.

Gaming Establishment Broadcasts for Sports Betting Feature

In various embodiments, alternative to or in addition to displaying the sports betting icon on the theme selection menu, the gaming system displays sports betting options to the player during a player's game session. More specifically, the gaming system informs a player at an EGM about the status of various sporting events (i.e., upcoming sporting events and in-progress sporting events) and any available sports bets which may be placed on such sporting events during a player's game session. In certain embodiments, this sporting event and sporting event wagering information is displayed to the player as one or more overlay images. Such broadcasting of information pertaining to the various sporting events and sports bets available to be placed partially mimics the experience certain players associate with a gaming establishment's sports book (without having to leave the EGM) and further assists these players in providing them information they would otherwise not remember.

Figure 1C:
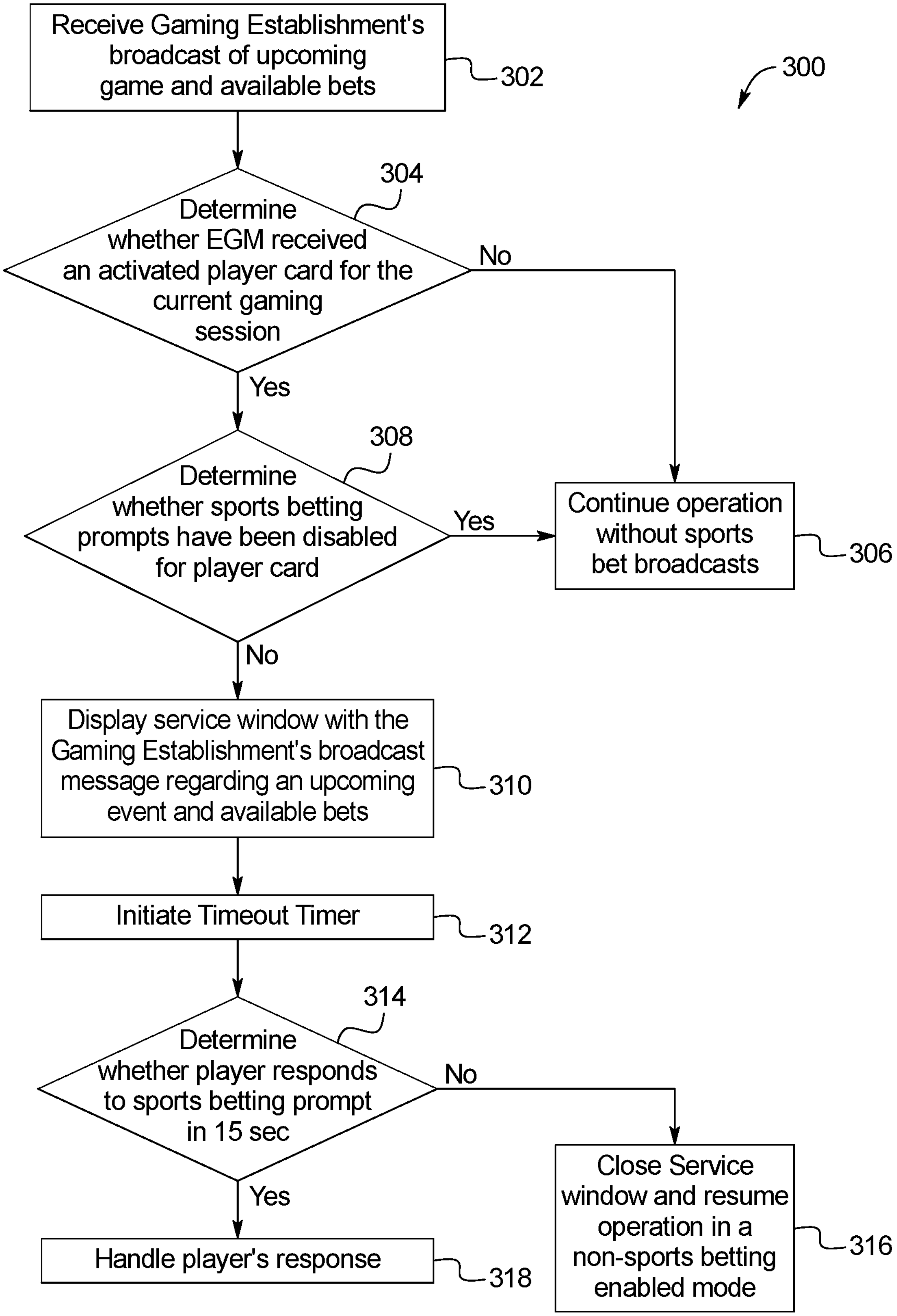

Referring now to FIG. 1C, which illustrates a flowchart of an example embodiment of a process 300 for receiving and displaying gaming establishment broadcasts of upcoming games and available bets at an EGM.

In operation of this embodiment, the gaming system receives a gaming establishment's broadcast regarding an upcoming game and available bets, as indicated by block 302. The gaming system determines whether the EGM received an activated player card for the current gaming session, as illustrated by diamond 304. That is, the gaming system determines whether any player is playing at the EGM, and if so whether the player is activated for the sports betting feature. If the EGM does not receive an activated player card for the current gaming session, the gaming system continues operation without sports bet broadcasts, as indicated by block 306.

If, on the other hand, the gaming system determines that the EGM received an activated player card (i.e., indicating that the sports betting feature has been activated for the player associated with the inserted player card), the gaming system determines whether sports betting prompts are disabled for the received player card, as indicated by diamond 308. More specifically, in certain embodiments, the player may elect to disable gaming establishment broadcasts. If the gaming system determines that sports betting prompts have been disabled, the gaming system continues operation without sports bet broadcasts, as indicated by block 306.

If the gaming system determines that sports betting prompts are not disabled for the received activated player card, the gaming system displays a service window with the gaming establishment's broadcast message regarding an upcoming event and available bets, as indicated by block 310.

Figure 2B:
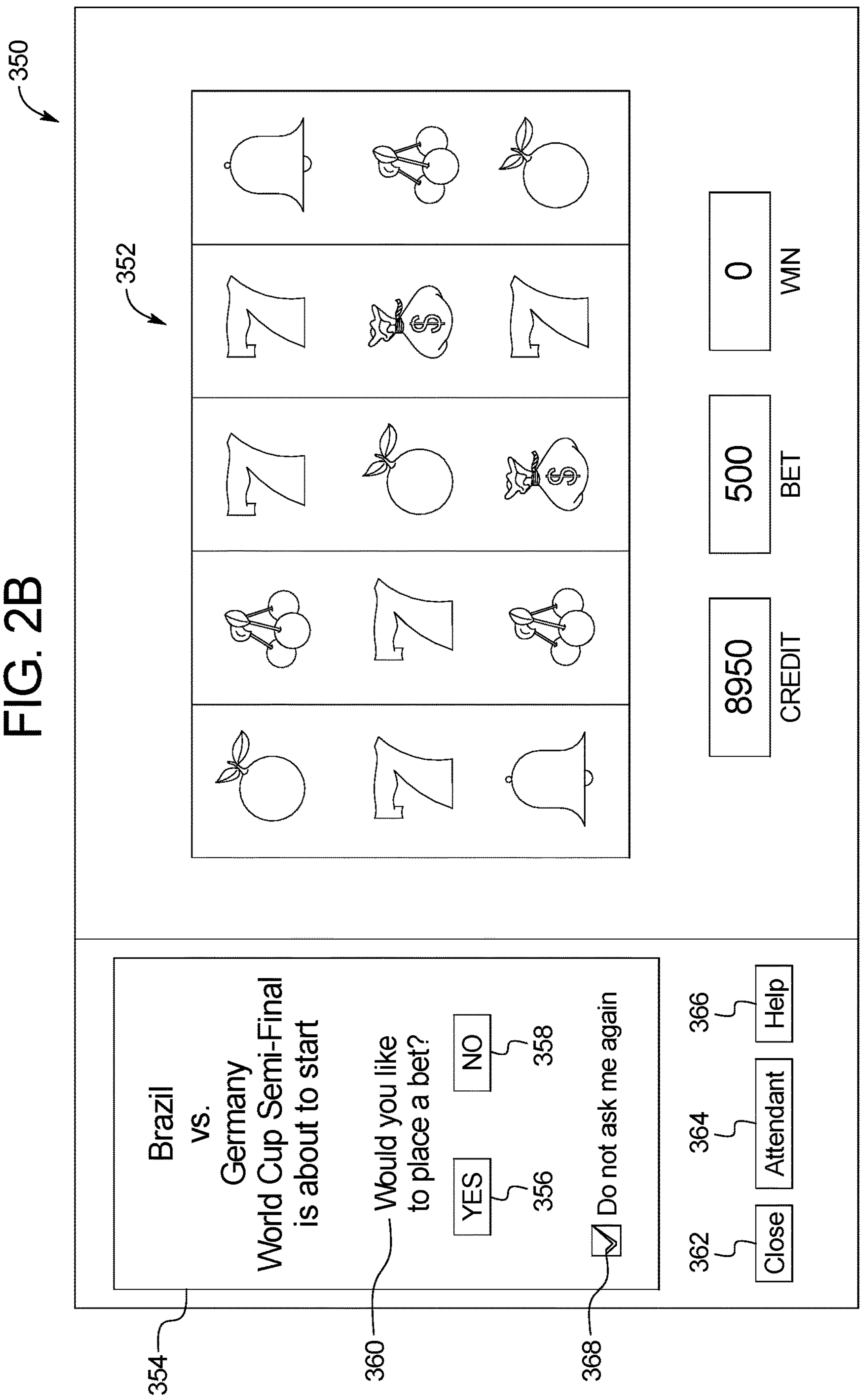

Turning to FIG. 2B, which illustrates a screen shot of a gaming establishment broadcast of an upcoming sporting event during a player's gaming session of one example embodiment. In this embodiment, the gaming system display 350 depicts a play of a game on the main screen 352 and a service window 354 on the left side of the display. In the service window 354, the gaming system displays the gaming establishment's message regarding the upcoming sporting event. Below the message is a sports betting prompt 360 stating "WOULD YOU LIKE TO PLACE A BET?" and two buttons: "YES" 356, and "NO" 358. While the gaming system displays the gaming establishment's broadcast message, the player's gaming session remains fully functional. The gaming system displays a "CLOSE" button 362 to close the service window and return to the gaming session. Below the sports betting prompt, the gaming system displays a checkbox 368 with the message "DO NOT ASK ME AGAIN." The gaming system displays this message to enable a player to disable all future gaming establishment broadcasts. In certain embodiments, the gaming system also displays an "ATTENDANT" button 364 to call for an attendant from the gaming establishment, and a "HELP" button 366 for additional resources. Alternatively, the player can choose to ignore the sports betting prompt which will go away on its own after a few seconds.

Returning to FIG. 1C, after displaying the service window with the gaming establishment broadcast, the gaming system initiates a timeout timer, as indicated by block 312. The timeout timer indicates how long the gaming system keeps the service window open. After initiating the timeout timer the gaming system determines whether the player responds to the sports betting prompt within a predetermined period of time (such as for example fifteen seconds, as indicated by diamond 314. If the player does not respond to the sports betting prompt, the gaming system hides the sports betting prompt and resumes operation in a non-sports betting enabled mode as indicated by block 316.

If on the other hand, the player responds to the sports betting prompt, the gaming system handles the player's response, as indicated by block 318. For example, in this embodiment, as depicted in FIG. 2B, the sports betting prompt states, "WOULD YOU LIKE TO PLACE A BET?" If the player responds by selecting "YES" within the predetermined period of time, the gaming system puts the current game in a tilt state and the service window expands to cover the entire screen. The player will see all of the options for betting within the service window. The gaming system enables the player to place a bet. If the player responds to the sports betting prompt by selecting "NO" within the predetermined period of time, the gaming system closes the service window and resumes operation in a non-sports betting enabled mode. In certain embodiments, the gaming system determines whether the player also selected the box to disable future gaming establishment broadcasts. If the player selects to disable all future gaming establishment broadcasts, the gaming system disables future sports betting prompts for the associated player card. If the player did not select to disable future gaming establishment broadcasts, the gaming system closes the service window and resumes operation in a non-sports betting enabled mode.

It should be appreciated that players that would not typically place sports bet may be willing to do when they are conveniently prompted with the gaming establishment's broadcasts while they are playing and because the player does not have to leave the EGM to place the bet. Such a configuration is also beneficial for certain players who do typically place sports bets but forget to make a bet due to their interest in the EGM gaming content. These players receive a reminder about available bets and can place any bets without disrupting their gaming session.

It should also be appreciated that even if the player disables future gaming establishment broadcasts for a player card, the player associated with that player card will have the option to open the Sports Bet menu manually and place bets. Additionally, broadcasts can be turned back on for that player card at the Player's Club or Sports book.

In one embodiment, inside the full screen sports bet window, the gaming system displays a "SETTINGS" menu that enables players to customize broadcast settings. For example, in one embodiment certain players may customize notifications so that only sports of interest are broadcasted to them. In another embodiment, certain players may customize notifications so that only broadcasts related to certain favorite teams are broadcasted to them. Other players may customize notifications to a specific number of notifications over a predetermined period of time. In certain embodiments, the gaming system enables players to customize notifications such that only bets of interest are broadcasted to them. For example, certain players may specify to only broadcast long shot bets. Additionally, through the settings menu, the gaming system enables the player the option to stop or resume gaming establishment broadcasts and to view current bets and bet history.

Placing Sports Bets

In various embodiments, the gaming system provides an interface for players to manually view all of the available sports book lines and place a bet at the EGM. More specifically, in one embodiment, once the player chooses to place a bet (i.e., through the theme selection menu or by selecting "YES" from a broadcast), the gaming system displays the service window as a full screen. The information the gaming system displays in the full screen menu is intended to show the bet information in a way that resembles what is available to the players who are placing bets at the sports book itself. Through this menu-driven interface, the gaming system enables the player to open a sports book account, place a sports bet, and have a sports book compatible ticket printed all at the EGM. In certain embodiments, this interface is accomplished by means of a "protocol translator" (such as, for example, SAS, G2S) which will be embedded in the "Sports book Server." This translator provides a means for the EGM's to talk to the Line Originator's software in order to place bets, receive odds and receive bet times.

In certain embodiments, the gaming establishment establishes one or more lines on one or more sporting events. In these embodiments, the gaming establishment is the Line Originator. On the other hand, many gaming establishment sports books do not have their own in-house bookmaker. Therefore, they do not produce their own lines as that can be both costly and risky. Accordingly, in certain alternative embodiments, the gaming establishment collaborates with a third party Line Originator who creates, publishes and maintains one or more lines for them.

Figure 3:
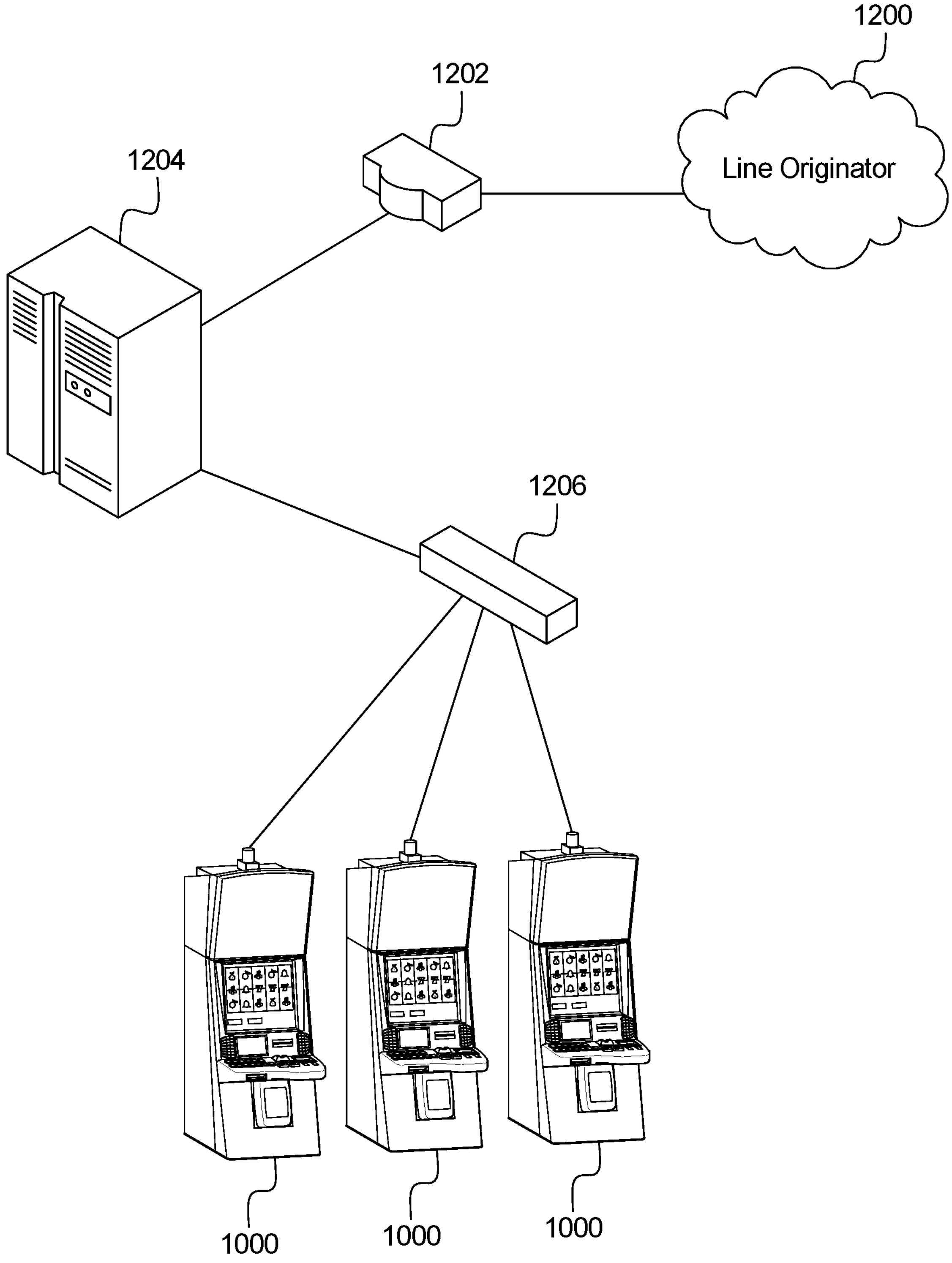
FIG. 3 is a schematic block diagram of one embodiment of the gaming establishment, line originator and EGM network configuration of the gaming system disclosed herein.

Referring now to FIG. 3, which is a schematic block diagram of one embodiment of the gaming system disclosed herein. In this embodiment, multiple EGMs 1000 are capable of receiving sports bets through the sports betting feature that the gaming system initiates from a service window at each EGM. The sports bet feature communicates with the sports book's Line Originator 1200 via the sports book server with the protocol translator 1202. In one embodiment, the protocol translator is a G2S/SAS to Line Originator Protocol Translator. From the sports book server 1202, available bets are routed through the gaming establishment server 1204 and through a router 1206 to each of the EGMs 1000.

In certain embodiments, the gaming system queries the Line Originator 1200 for the current games, times, available bets, odds, and any other necessary data for placing a bet. The gaming system displays this data on the EGM 1000 to enable the player to place any sports bets through the sports bet feature. Similarly, the gaming system sends the bets made by the player at the EGM 1000 to the Line Originator 1200, and receives corresponding confirmation from the Line Originator 1200. The gaming system then prints a ticket that may be cashed at the EGM or at the sports book.

Figure 1D:
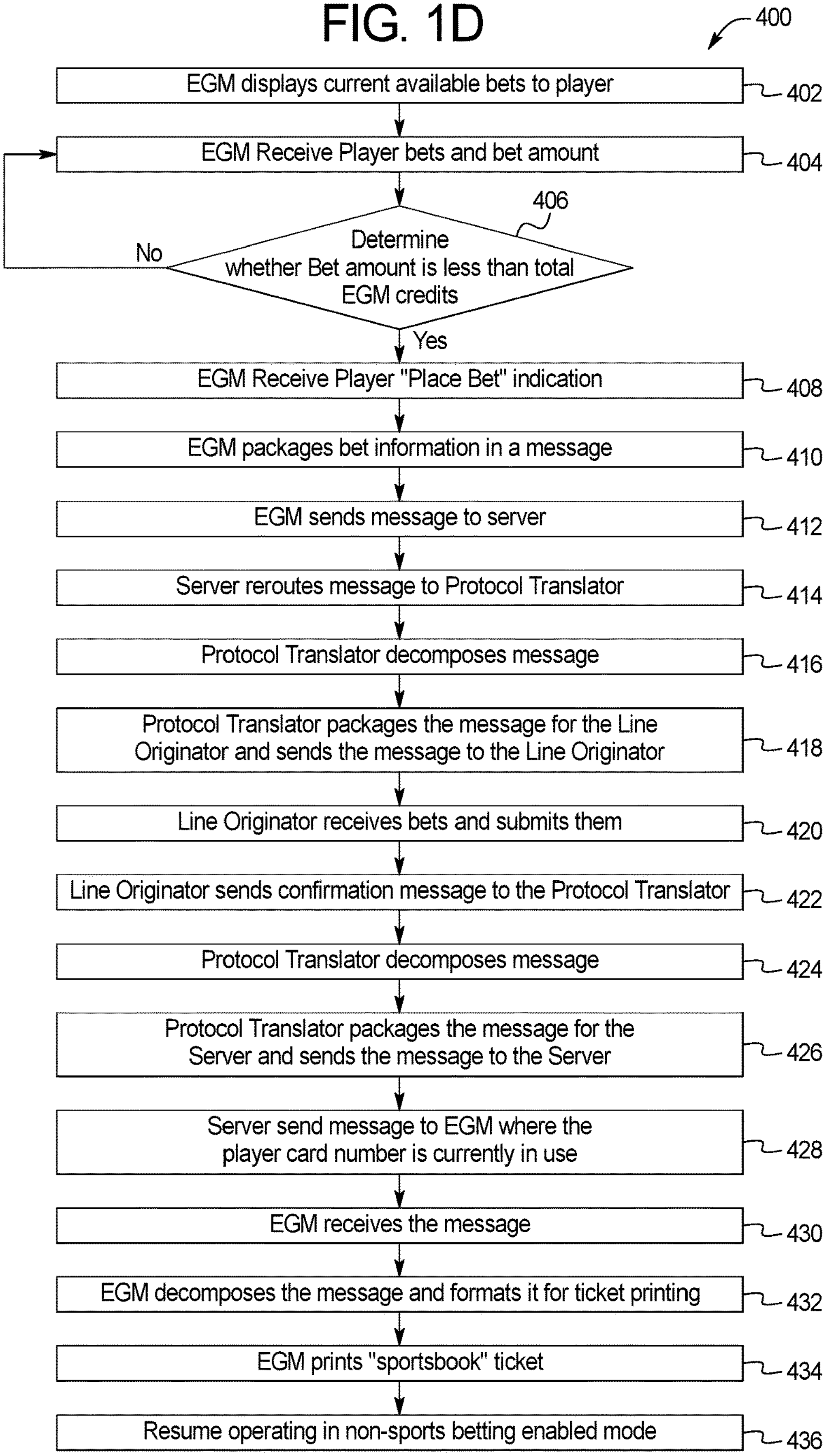

Turning to FIG. 1D, which illustrates a flowchart of an example embodiment of a process 400 for enabling a player to place a sports bet and receive a sports bet ticket. Referring now to both FIGS. 1D and 3, in one example embodiment, after the player select the sports betting feature (i.e., through the theme selection menu or through a casino broadcast), the gaming system displays current available bets to the player at the EGM 1000 as indicated by block 402. If the player selects to place a bet, the EGM 1000 receives the player's bet selection and the bet amount as indicated by block 404.

In this example embodiment, the gaming system enables the player to use the player's current credit amount to fund the placed bet. It should be appreciated that by utilizing the player's existing credit, the gaming system enables the player to place a bet without providing separate funding and enables the player to utilize any credit that the player won at the EGM. Such a configuration may encourage players who would not typically place a sports bet to be willing to do so since the player does not have to leave the EGM, and can use funds that are already present at the EGM.

After the gaming system receives the player's bet selection, the gaming system determines whether the bet amount is less than the total remaining EGM credits, as indicated by block 406. If the bet amount is not less than the total remaining EGM credits, the gaming system notifies the player and enables to place the bet again. For example, if the player has 50 credits, the EGM will not enable the player to place a bet worth 100 credits on a sports event. In this example, the EGM prompts the player to add credits. In certain embodiments, if a player has $1,000 worth of credits in the EGM, but there's a jurisdictional requirement that says the maximum bet on sporting events is $500.00, then the EGM does not enable the player to place a bet for more than $500.

If the gaming system determines that the bet amount is less than the total remaining EGM credits, the gaming system determines whether the EGM 1000 receives the player's "Place Bet" indication, as indicated by block 408. More specifically, in certain embodiments, the gaming system enables the player to select a "Place Bet" button as the indication that the player wishes to place the bet. After the gaming system receives the player's indication to place the bet, the EGM 1000 packages the bet information in a message, as indicated by block 410.

In this example embodiment, the EGM 1000 sends the bet information message to the gaming establishment server 1204, as indicated by block 412. The gaming establishment server 1204 routes the message to the protocol translator 1202 in the sports book server, as indicated by block 414. After receiving the bet information message at the sports book server, the protocol translator 1202 decomposes the message, as indicated by block 416. The protocol translator 1202 then packages the decomposed message for the Line Originator 1200 and sends the message to the Line Originator 1200, as indicated by block 418.

In this example embodiment, after the Line Originator 1200 receives the message with the repackaged bet information, the Line Originator submits the sports bets, as indicated by block 420. It should be appreciated that the Line Originator places the bets just as they would be placed if they were received from a sports book. Once the bets have been submitted, the Line Originator 1200 sends a confirmation message to the protocol translator 1202 at the sports book server 1204, as indicated by block 422.

Continuing with this example embodiment, at the sports book server, the protocol translator 1202 decomposes the confirmation message from the Line Originator, as indicated by block 424. The protocol translator 1202 then packages the confirmation message for the gaming establishment server 1204 and sends the message to the gaming establishment server 1204 as indicated by block 426.

In this example embodiment, once the gaming establishment server 1204 receives the confirmation message, the gaming establishment server 1204 sends the confirmation message to the EGM 1000 where the player card number is currently in use, as indicated by block 428. More specifically, the gaming establishment server determines which EGM 1000 the player that placed the sports bet is active at. The gaming establishment server routes the confirmation message to the EGM 1000 where the player that placed the bet is active and the EGM 1000 receives the confirmation message, as indicated by block 430. After receiving the confirmation message, the EGM decomposes the message and formats the message for printing the ticket, as indicated by block 432.

In this example embodiment, after decomposing and reformatting the received confirmation message, the EGM 1000 prints the sports book ticket for the player, as indicated by block 434. It should be appreciated that the gaming system prints a ticket compatible with the sports book system such that the EGM issued ticket associated with the placement of a winning sports bet may be redeemed at a gaming establishment's sports book as if the winning sports bet ticket was issued directly by the gaming establishment's sport book.

After printing the ticket for the placed bet, the EGM 1000 resumes operating in a non-sports betting enabled mode as indicated by block 436. Such a configuration enables players to continue gaming on the EGM after placing their bet without ever having to leave the EGM. This provides the player a unique service that is convenient and provides the player additional entertainment.

Score Update Notifications and Final Game Result Display

In various embodiments, the gaming system displays a banner with score updates and displays the final outcome for any player that places a sports bet and is active at an EGM. More specifically, if an activated player that placed a bet is active at an EGM, the EGM displays score updates on a player banner and once the final game results are available, the EGM displays the final game results. In certain embodiments, the gaming system displays score updates and/or final outcome notification through a service window. In certain alternative embodiments, the gaming system displays the score update notification and/or final outcome notification as one or more overlay images. Such broadcasting of information pertaining to the various sporting events and sports bets partially mimics the experience certain players associate with a gaming establishment's sports book (without having to leave the EGM) and further assists these players in providing them information they would otherwise not remember.

Figure 1E:
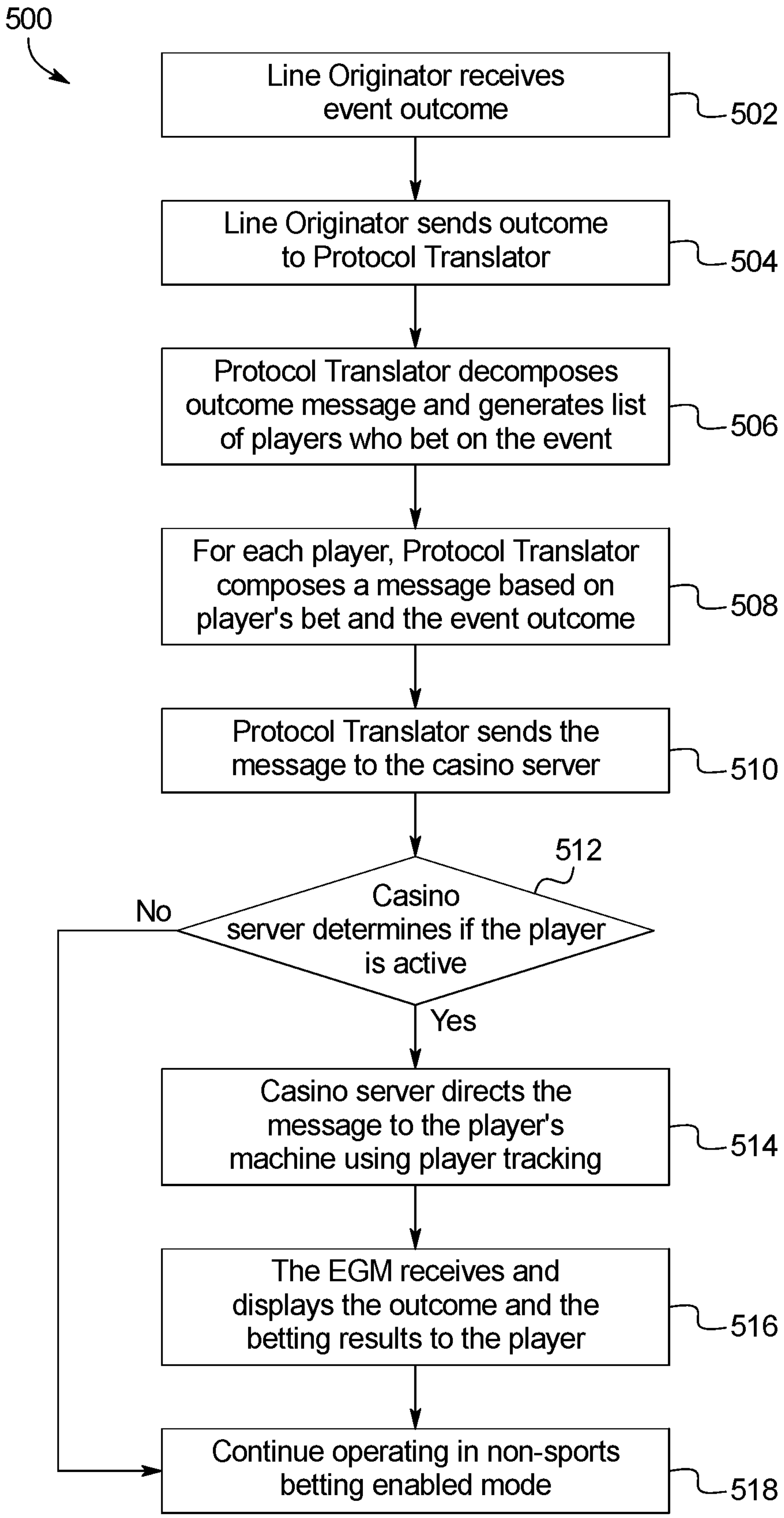

Referring now to FIG. 1E, which illustrates a flowchart of an example embodiment of a process 500 for displaying score update and final game result notifications to an activated player. In this example embodiment, the Line Originator receives score updates and/or the event outcome, as indicated by block 502. The Line Originator sends the score updates and/or the event outcome to the protocol translator, as indicated by block 504. The protocol translator decomposes the message from the Line Originator and generates a list of players who bet on the event associated with the Line Originator message, as indicated by block 506. For each player, the protocol translator composes a message based on the player's bet and the score update and/or event outcome, as indicated by block 508. The protocol translator sends the message to the gaming establishment server, as indicated by block 510.

After the gaming establishment server receives the score update and/or event outcome notification, the gaming establishment server determines if the player is active at an EGM, as indicated by diamond 512. More specifically, using the player tracking capabilities, the gaming establishment server determines if player cards with which bets have been placed are currently active on the gaming establishment floor. If the player is not active, the EGMs continue operating in a non-sports betting enabled mode, as indicated by block 518.

On the other hand, if the player is active, the gaming establishment server routes the message to the EGM where the player inserted the player tracking card, as indicated by block 514. The EGM receives the score update and/or event outcome notification and displays the notification to the player, at indicated by block 516. In certain embodiments, the notification is displayed in a player banner on the display. In other embodiments, the notification is a service window that the gaming system displays on part of the display or as an overlay image.

After displaying the score update and/or event outcome notification, the EGM continues operating in a non-sports betting enabled mode, as indicated by block 518. In certain embodiments, the gaming system enables the player to close out the notification. In other embodiments, after a set amount of time, the EGM will remove the notification and revert back to non-sports betting enabled mode.

Figure 2C:
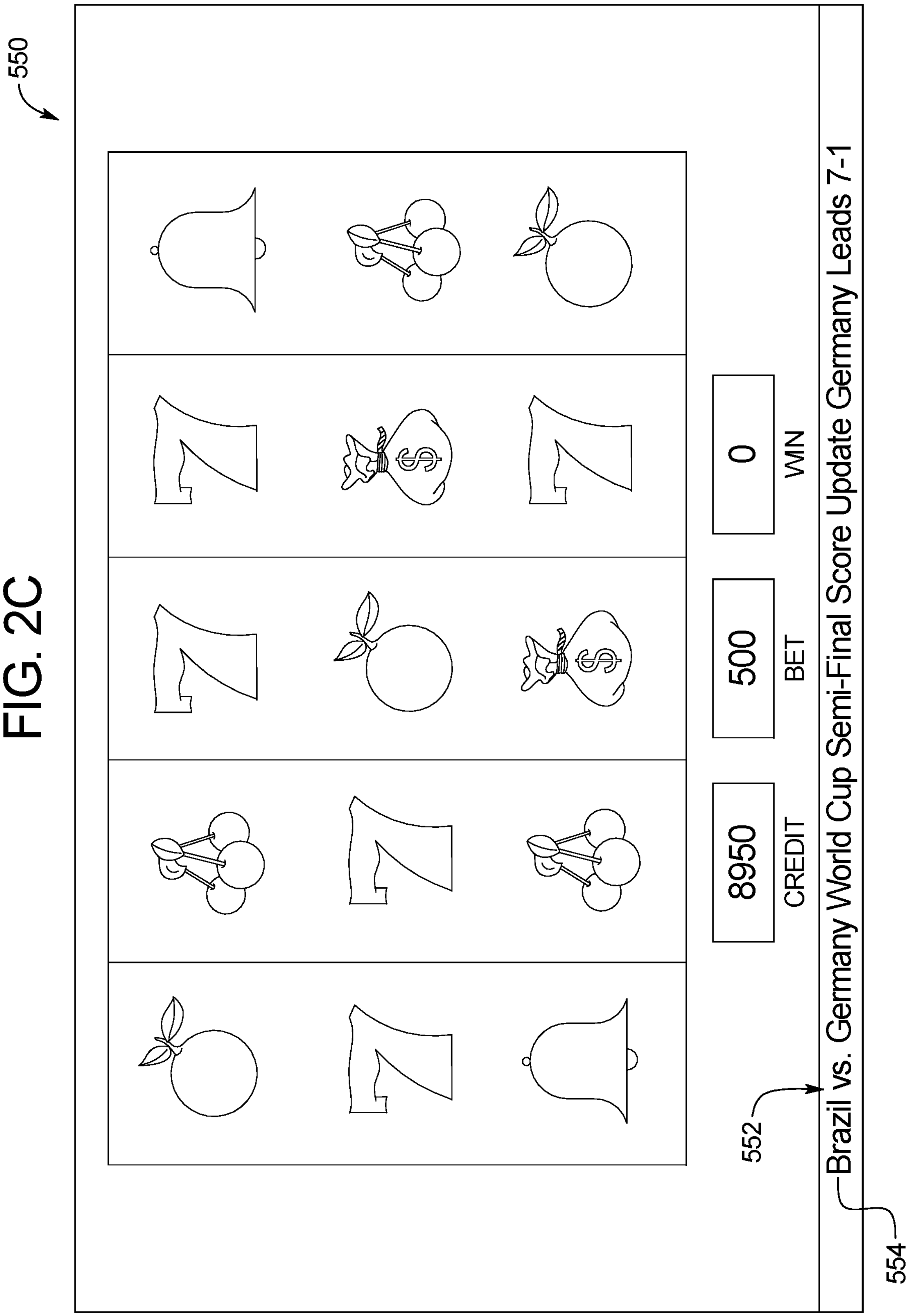

FIG. 2C is a screen shot of the gaming system displaying a score update on a player banner of one example embodiment. In this embodiment, the player banner 552 is at the bottom of the display 550. In this example embodiment, the score notification 554 on the player banner reads "BRAZIL VS GERMANY WORLD CUP SEMI-FINAL SCORE UPDATE: GERMANY LEADS 7-1." In certain embodiments, the gaming system displays the player banner across the top of the display or along one of the sides. In certain embodiments, the notification is a scrolling message. In other embodiments, the notification is a static message that appears for a predetermined period of time.

Figure 2D:
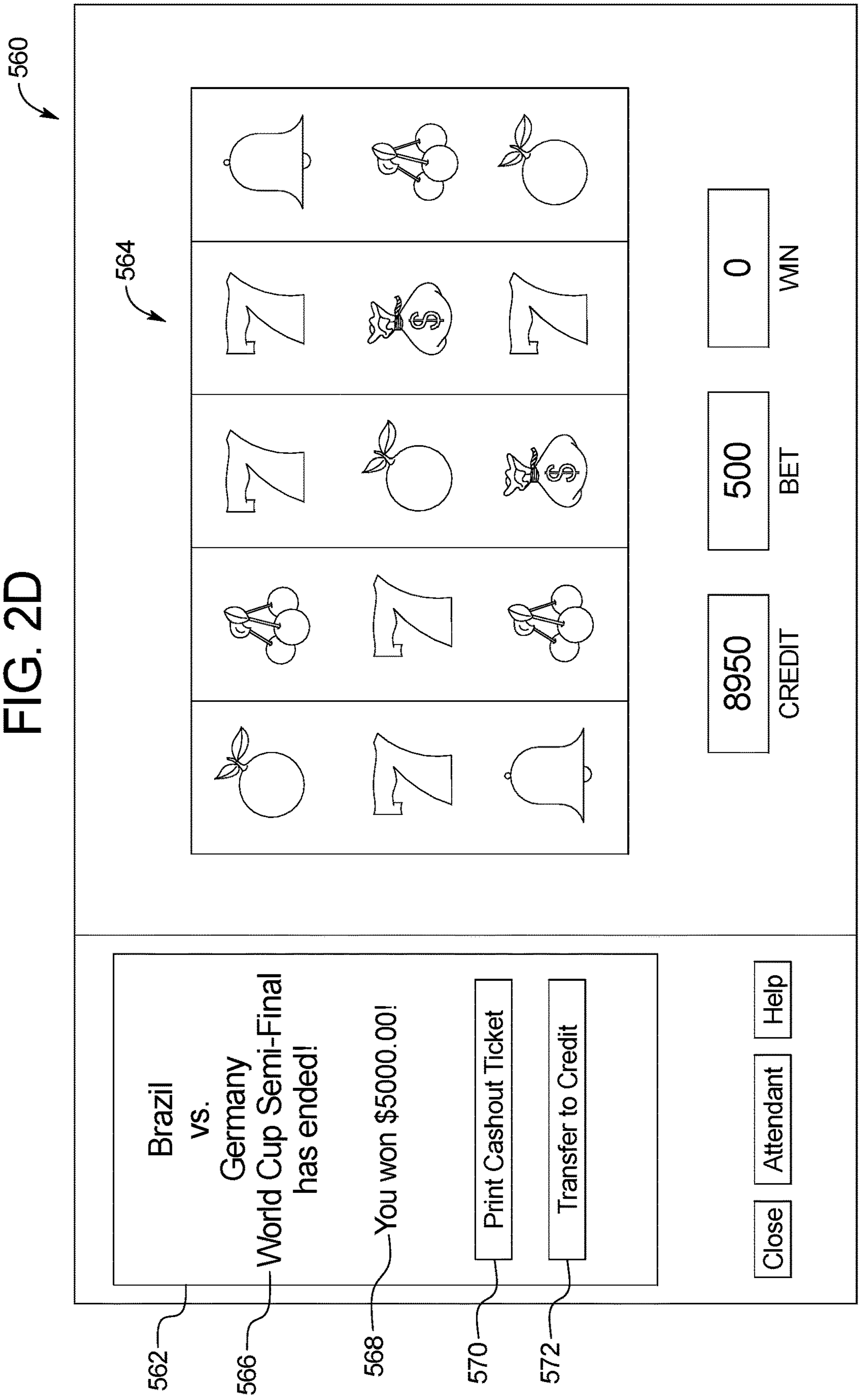

FIG. 2D is a screen shot of the gaming system displaying a final event outcome notification of one example embodiment. In this embodiment, the gaming system displays a service window 562 on the left side of the EGM display 560. As illustrated, the gaming system does not interrupt the gaming session displayed on the main screen 564 on the right side of the EGM display 560. The gaming system displays a final event outcome message 566 in service window 562. In this example embodiment, the final event outcome message 566 is "BRAZIL VS GERMANY WORLD CUP SEMI-FINAL HAS ENDED!" The gaming system also displays a sports bet results message 568 in the service window. In this example embodiment the results message 568 is "YOU WON $5000.00!"

It should be appreciated that the gaming system enables players to customize score update notifications and final game outcome notifications. As described above, in one embodiment, inside the full screen sports bet window, the gaming system displays a "SETTINGS" menu that enables players to customize notification settings. In certain embodiments, players customize the type of notifications that the payer receives. For example, in certain embodiments players may customize notification so they only receive score update notifications regarding placed bet. In other embodiments, players may specify to receive score update notifications regarding related sporting events even if the player did not place a bet on the sporting events.

In various embodiments, players customize the manner in which they receive notifications. For example, in one embodiment, a player may specify that all notifications and all final game scores are displayed in a service window. In another embodiment, a player may specify that all notifications of score updates are displayed in a banner in a certain location of the screen, and a final outcome notification is displayed in a service window. Additionally, in certain embodiments, player may specify the frequency or quantity of notifications. In other embodiments, the player may specify the duration that the notifications remain on the player's display.

Collecting Earnings

In various embodiments, the gaming system enables a player to redeem one or more sports bet tickets directly at the EGM. More specifically, regardless of whether the player placed a bet at an EGM or at a sports book, if the player wins the bet, there is an option to transfer the winnings to the EGM and another option to print a "cashout ticket." Accordingly, if a player is active at an EGM and the player wins a bet, the player can redeem any winnings without leaving the EGM.

In certain alternative embodiments, the gaming system enables the player to redeem one or more of the sports bet tickets from an EGM at a sports book. That is, in one embodiment, even if a player places a sports bet at an EGM, the player can later redeem any winnings from the placed bet at the sports book.

Turning back to FIG. 2D, in addition to the final outcome notification messages described above, the gaming system displays options to redeem any winnings in the service window. Accordingly, as illustrated in FIG. 2D, the gaming system displays a "TRANSFER TO CREDIT" icon 572 and a "PRINT CASHOUT TICKET" icon 570. It should be appreciated that both of these options may be enabled or disabled by a gaming establishment (based on jurisdictional regulations).

In one embodiment, if the player selects the "transfer to credit" option, the gaming system enables the player to redeem a winning gaming establishment sports book issued ticket (or an EGM issued sports bet ticket redeemable at the gaming establishment's sports book) to fund a credit balance of the EGM with a quantity of credits corresponding to the amount associated with the winning sports bet ticket.

In this example embodiment, the gaming system invalidates the original ticket that was printed at the time the bet was placed. To invalidate the original ticket, the gaming system sends a message to the gaming establishment server to invalidate the ticket. The gaming establishment server, in turn, relays this message to the Line Originator via the protocol translator. This redemption occurs regardless of whether a winning sports bet ticket was issued by the gaming establishment's sports book or by the EGM.

In certain embodiments, if the player selects the option to print a "cashout ticket," the gaming system enables the player to redeem a winning gaming establishment sports issued ticket (or an EGM issued sports bet ticket redeemable at the gaming establishment's sports book) in exchange for a cashout ticket issued by the EGM. In this embodiment, the cashout ticket is cashable at a cashout kiosk (where EGM cashout tickets are cashed) or may be used to establish a credit balance at another EGM. In certain embodiments, if the player chooses to print a "Cashout" ticket, a new ticket will be printed that is not cashable at the sports book. However, it is cashable at the kiosks where standard EGM tickets may be cashed (and alternatively, may be used in a different EGM). In this embodiment, the gaming system invalidates the original sports book ticket as described in the previous paragraph. This is intended to provide a convenience to the player so he does not have to physically go to the sports book to cash a winning ticket. This option can be disabled in cases where the Line Originator did not accept messages invalidating tickets or if the original ticket (printed at the time of the bet) was printed using a method that is compatible with both the sports book and "Ticket-In Ticket-Out" kiosks.

Such a configuration of enabling a player to redeem a winning sports bet ticket directly at the EGM provides players with the convenience of continuing their gaming session at the EGM without having to interrupt their gaming session to visit the gaming establishment's sports book.

It should be appreciated that in certain embodiments, the sports betting feature is available at every EGM within a gaming establishment. In certain alternative embodiments, only certain EGMs within the gaming establishment are capable of providing the sports betting feature. It should further be appreciated that the EGMs that are capable of providing the sports betting feature may have increased traffic from patrons seeking the ability to place sports bets and receive notifications regarding previously placed bets while playing at the EGM.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal computing device" as used herein represents one personal computing device or a plurality of personal computing devices, and "central server, central controller, or remote host" as used herein represents one central server, central controller, or remote host or a plurality of central servers, central controllers, or remote hosts.

Figure 4:
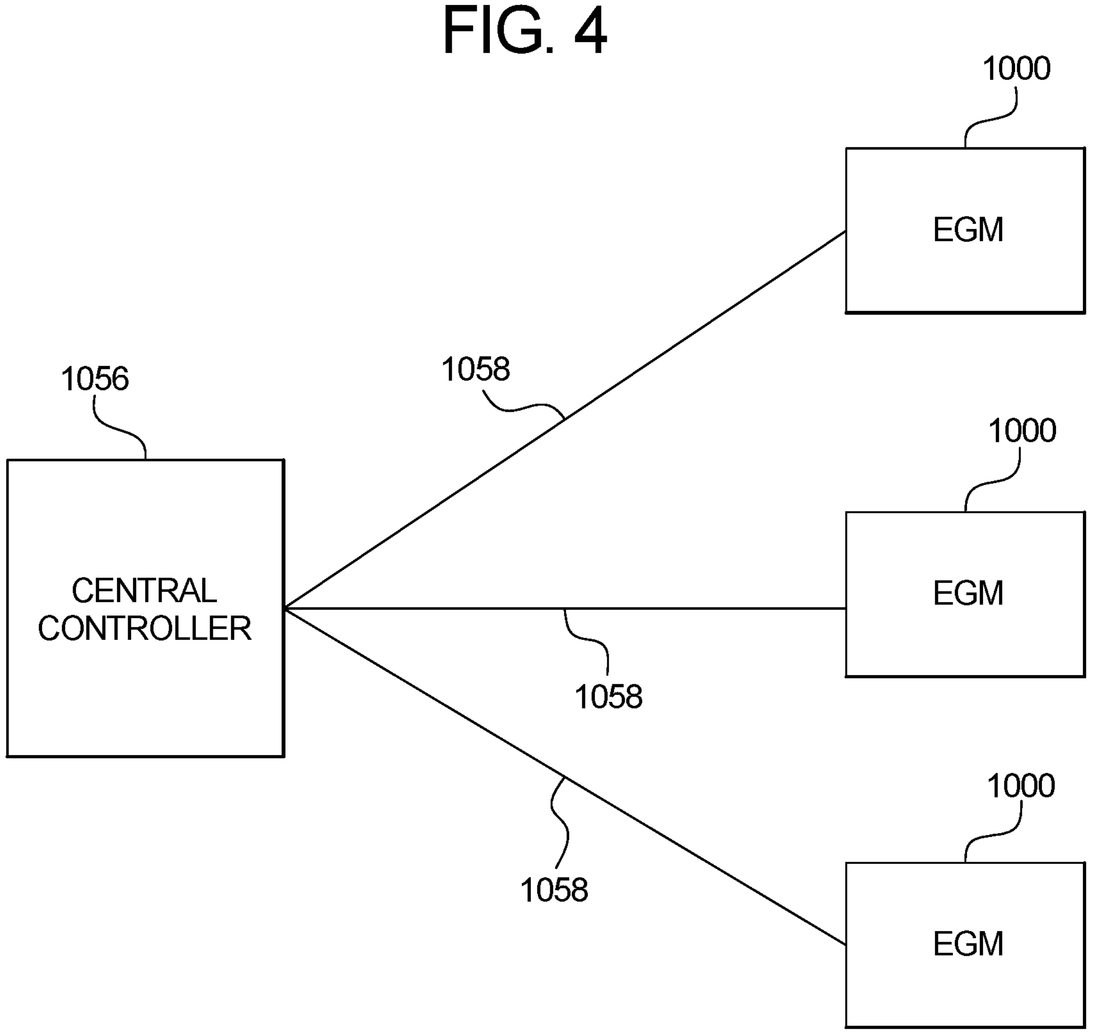
FIG. 4 is a schematic block diagram of one embodiment of a network configuration of the gaming system disclosed herein.

As noted above, in various embodiments, the gaming system includes an EGM (or personal computing device) in combination with a central server, central controller, or remote host. In such embodiments, the EGM (or personal computing device) is configured to communicate with the central server, central controller, or remote host through a data network or remote communication link. In certain such embodiments, the EGM (or personal computing device) is configured to communicate with another EGM (or personal computing device) through the same data network or remote communication link or through a different data network or remote communication link. For example, the gaming system illustrated in FIG. 4 includes a plurality of EGMs 1000 that are each configured to communicate with a central server, central controller, or remote host 1056 through a data network 1058.

In certain embodiments in which the gaming system includes an EGM (or personal computing device) in combination with a central server, central controller, or remote host, the central server, central controller, or remote host is any suitable computing device (such as a server) that includes at least one processor and at least one memory device or data storage device. As further described herein, the EGM (or personal computing device) includes at least one EGM (or personal computing device) processor configured to transmit and receive data or signals representing events, messages, commands, or any other suitable information between the EGM (or personal computing device) and the central server, central controller, or remote host. The at least one processor of that EGM (or personal computing device) is configured to execute the events, messages, or commands represented by such data or signals in conjunction with the operation of the EGM (or personal computing device). Moreover, the at least one processor of the central server, central controller, or remote host is configured to transmit and receive data or signals representing events, messages, commands, or any other suitable information between the central server, central controller, or remote host and the EGM (or personal computing device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal computing device). Further, one, more than one, or each of the functions of the at least one processor of the EGM (or personal computing device) may be performed by the at least one processor of the central server, central controller, or remote host.

In certain such embodiments, computerized instructions for controlling any games (such as any primary or base games and/or any secondary or bonus games) displayed by the EGM (or personal computing device) are executed by the central server, central controller, or remote host. In such "thin client" embodiments, the central server, central controller, or remote host remotely controls any games (or other suitable interfaces) displayed by the EGM (or personal computing device), and the EGM (or personal computing device) is utilized to display such games (or suitable interfaces) and to receive one or more inputs or commands. In other such embodiments, computerized instructions for controlling any games displayed by the EGM (or personal computing device) are communicated from the central server, central controller, or remote host to the EGM (or personal computing device) and are stored in at least one memory device of the EGM (or personal computing device). In such "thick client" embodiments, the at least one processor of the EGM (or personal computing device) executes the computerized instructions to control any games (or other suitable interfaces) displayed by the EGM (or personal computing device).

In various embodiments in which the gaming system includes a plurality of EGMs (or personal computing devices), one or more of the EGMs (or personal computing devices) are thin client EGMs (or personal computing devices) and one or more of the EGMs (or personal computing devices) are thick client EGMs (or personal computing devices). In other embodiments in which the gaming system includes one or more EGMs (or personal computing devices), certain functions of one or more of the EGMs (or personal computing devices) are implemented in a thin client environment, and certain other functions of one or more of the EGMs (or personal computing devices) are implemented in a thick client environment. In one such embodiment in which the gaming system includes an EGM (or personal computing device) and a central server, central controller, or remote host, computerized instructions for controlling any primary or base games displayed by the EGM (or personal computing device) are communicated from the central server, central controller, or remote host to the EGM (or personal computing device) in a thick client configuration, and computerized instructions for controlling any secondary or bonus games or other functions displayed by the EGM (or personal computing device) are executed by the central server, central controller, or remote host in a thin client configuration.

In certain embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a local area network (LAN) in which the EGMs (or personal computing devices) are located substantially proximate to one another and/or the central server, central controller, or remote host. In one example, the EGMs (or personal computing devices) and the central server, central controller, or remote host are located in a gaming establishment or a portion of a gaming establishment.

In other embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a wide area network (WAN) in which one or more of the EGMs (or personal computing devices) are not necessarily located substantially proximate to another one of the EGMs (or personal computing devices) and/or the central server, central controller, or remote host. For example, one or more of the EGMs (or personal computing devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal computing devices) are located. In certain embodiments in which the data network is a WAN, the gaming system includes a central server, central controller, or remote host and an EGM (or personal computing device) each located in a different gaming establishment in a same geographic area, such as a same city or a same state. Gaming systems in which the data network is a WAN are substantially identical to gaming systems in which the data network is a LAN, though the quantity of EGMs (or personal computing devices) in such gaming systems may vary relative to one another.

In further embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is an internet (such as the Internet) or an intranet. In certain such embodiments, an Internet browser of the EGM (or personal computing device) is usable to access an Internet game page from any location where an Internet connection is available. In one such embodiment, after the EGM (or personal computing device) accesses the Internet game page, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal computing device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal computing device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal computing device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal computing devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 5:
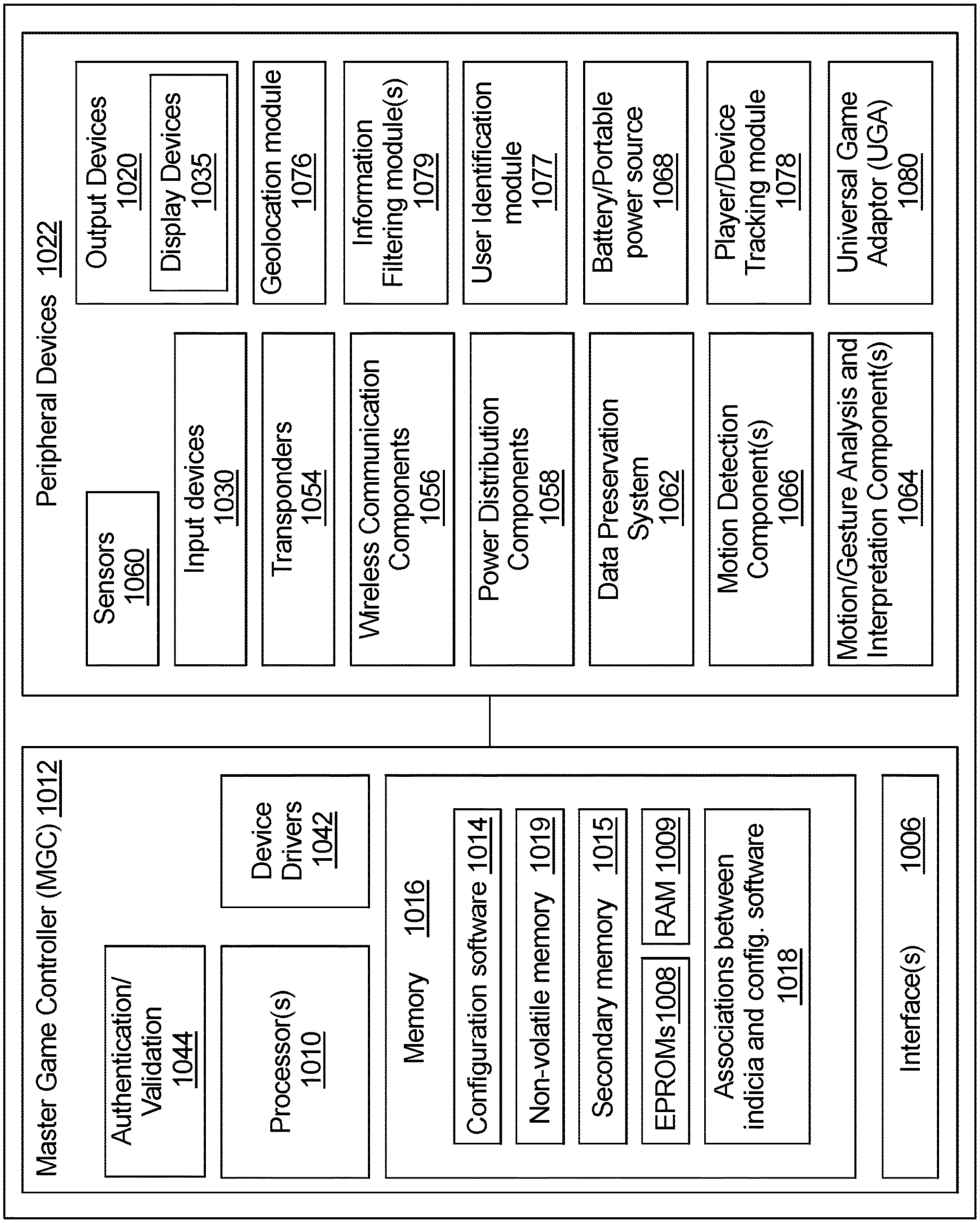
FIG. 5 is a schematic block diagram of one embodiment of an electronic configuration of an example gaming system disclosed herein.
Figure 6A:
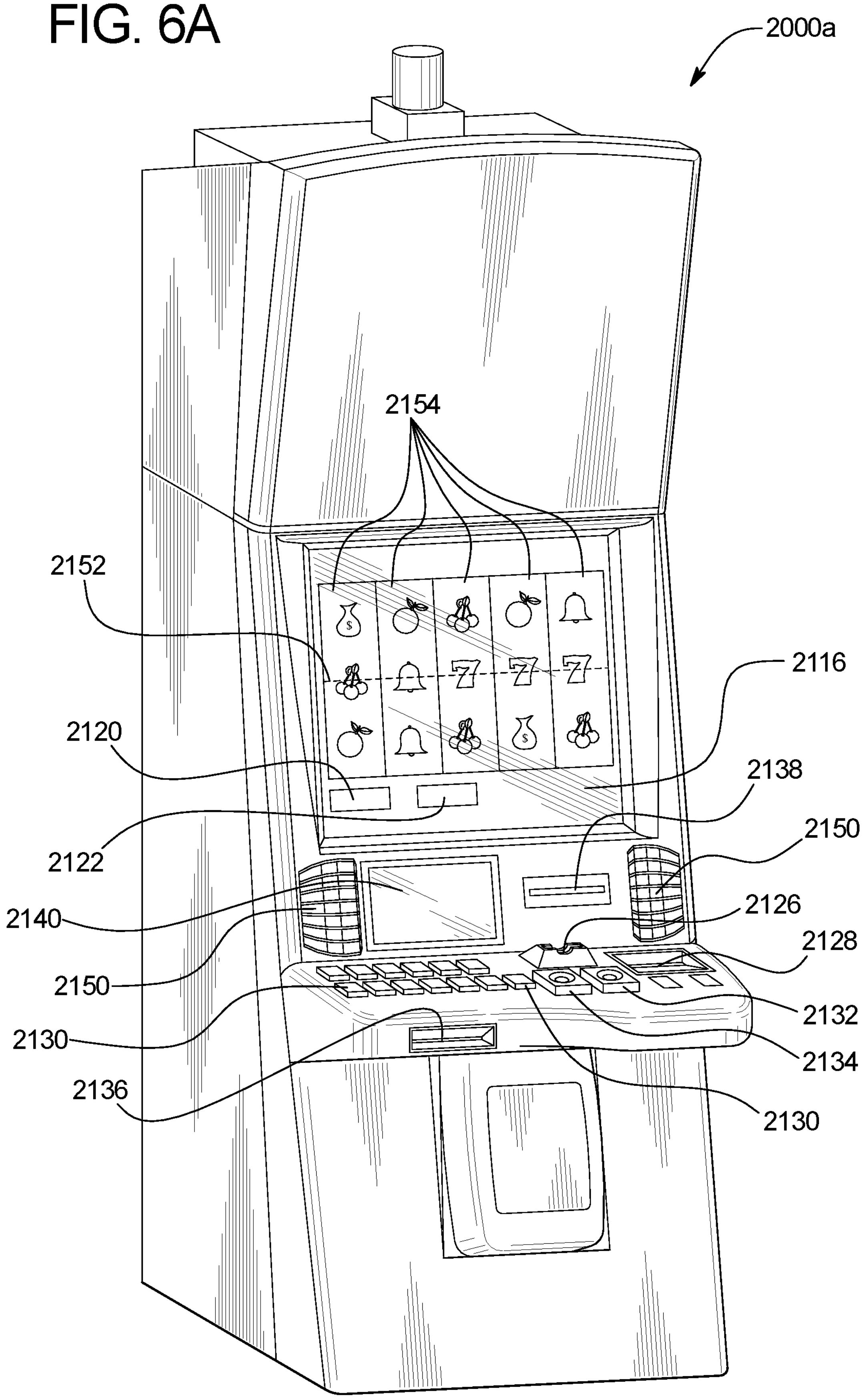
FIGS. 6A and 6B are perspective views of example alternative embodiments of the gaming system disclosed herein.
Figure 6B:
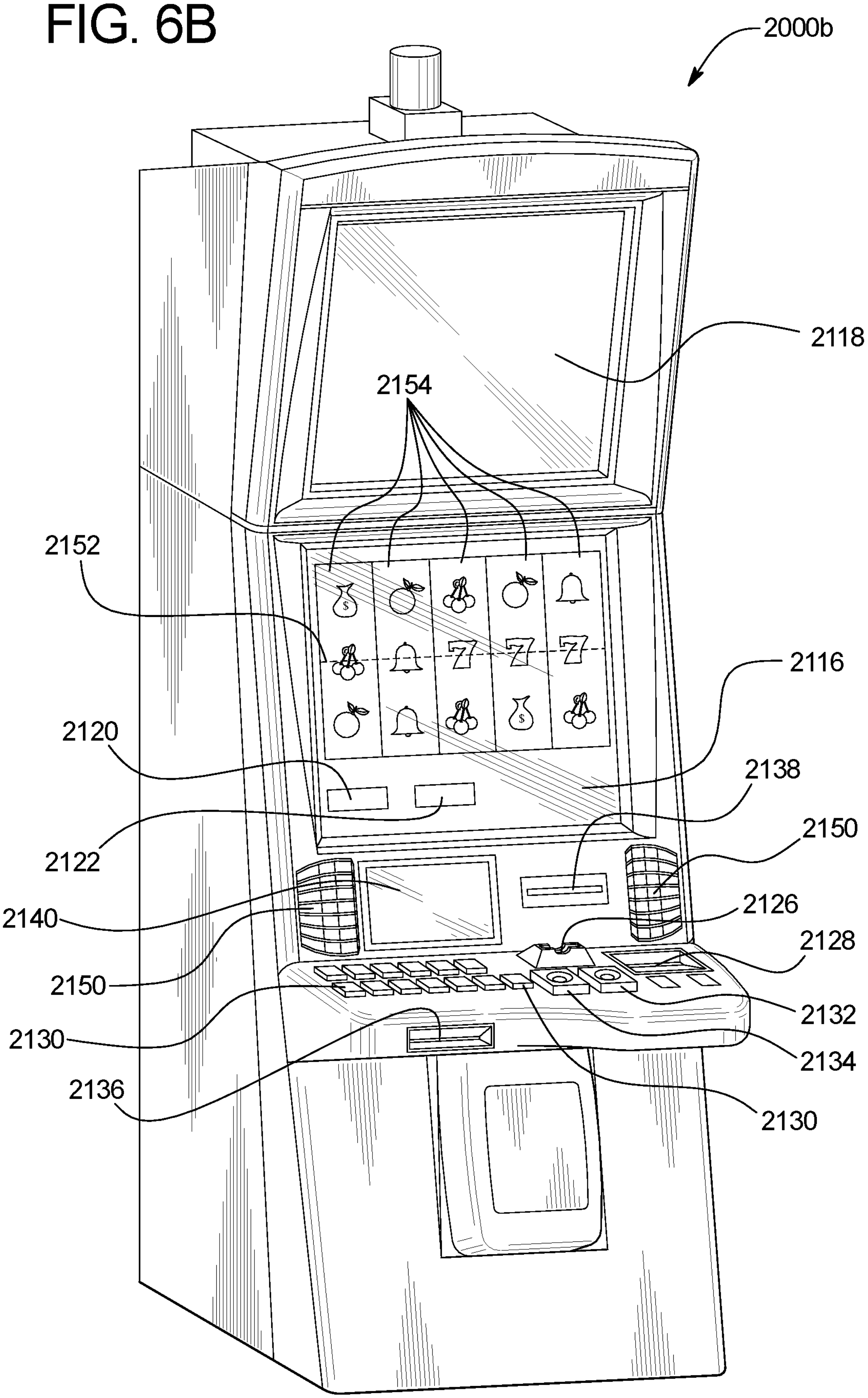

FIG. 5 is a block diagram of an example EGM 1000 and FIGS. 6A and 6B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620, 047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; (14) at least one information filtering module 1079; and (15) at least one universal game adaptor ("UGA")1080.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 6A includes a central display device 2116, a player tracking display 2140, a credit display 2120, and a bet display 2122. The example EGM 2000*b* illustrated in FIG. 6B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 6A and 6B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 6A and 6B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrates in FIGS. 6A and 6B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 6A and 6B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 6A and 6B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 6A and 6B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 6A and 6B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

The at least one universal game adaptor 1080 is configured to mix two or more video signals onto one EGM display. In certain embodiments, the at least one universal game adaptor also splits touches or inputs from the display screen of the EGM to send back to the video signal generators. Examples of using universal game adaptors are described in U.S. Pat. Publ. No. 2013/0203491, entitled "Electronic Gaming Machine Monitor With Universal Gaming Adaptor Capabilities," which is incorporated herein by reference.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 6A and 6B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 6A and 6B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 6B includes a payline 2152 and a plurality of reels 2154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201, 662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM , recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power- off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A device comprising:

a processor; and a memory device that stores a plurality of instructions that, when executed by the processor, cause the processor to:

cause a display, by a display device and in a sports betting service window, of a sports bet available to be placed, the sports betting service window being distinct from a game window simultaneously displayed by the display device and controlled by a processor of an electronic gaming machine and the sports betting service window being controlled, independent of the processor of the electronic gaming machine, based on first data received from a sports book server, and responsive to a placement of the sports bet, cause a display, by the display device and in the sports betting service window, of a deduction of an amount associated with the sports bet from a credit balance, wherein a first ticket associated with the placed sports bet is associated with second data received from the sports book server confirming the placement of the sports bet, and responsive to the sports bet being a winning sports bet, the first ticket associated with the sports bet is thereafter redeemable at a sports book associated with the sports book server.

2. The device of claim 1, wherein another credit balance displayed by the display device in the game window is different from the credit balance displayed by the display device in the sports betting service window.

3. The device of claim 1, wherein the memory device stores a plurality of further instructions that, when executed by the processor after the placement of the sports bet, cause the processor to cause a display, by the display device and in the sports betting service window, of a score update associated with the sports bet.

4. The device of claim 1, wherein the memory device stores a plurality of further instructions that, when executed by the processor prior to the display, by the display device and in the sports betting service window, of the sports bet available to be placed, cause the processor to cause a display, by the display device and in the sports betting service window, of a message, based on an identification of a user, of whether the user is enabled to place the sports bet.

5. The device of claim 1, wherein the displayed sports bet available to be placed is based, at least in part, on a preexisting setting of an identified user.

6. The device of claim 1, wherein the device comprises a communication interface comprising a first SAS communication protocol serial interface connectable to a SAS communication protocol serial interface of the electronic gaming machine, and a second SAS communication protocol serial interface connectable to a SAS communication protocol serial interface of the sports book server.

7. The device of claim 6, wherein the second data received from the sports book server is translated via a protocol translator embedded in the sports book server.

8. The device of claim 1, wherein the first ticket comprises a virtual ticket.

9. The device of claim 1, wherein the memory device stores a plurality of further instructions that, when executed by the processor responsive to a redemption of a second ticket associated with another sports bet placed apart from the electronic gaming machine being a winning sports bet ticket, cause the processor to cause a display, by the display device and in the sports betting service window, of a modification of the credit balance based, at least in part, on a value associated with the winning sports bet ticket, wherein data associated with the redemption of the winning sports bet ticket communicated to the sports book server prevents the winning sports bet ticket from thereafter being redeemable at the sports book.

10. An electronic gaming machine comprising:

a display device;

a sports bet ticket printer;

a processor; and a memory device which stores a plurality of instructions, which when executed by the processor, cause the processor to:

cause the display device to display, in a service window, a sports bet available to be placed, the service window being distinct from a game window displayed by the display device and controlled by the processor and the service window being controlled, independent of the processor, based on first data received from a sports book server, and responsive to a placement of the sports bet, cause the display device to display, in the service window, a deduction of an amount associated with the sports bet from a credit balance, wherein a ticket, printed by the sports bet ticket printer and associated with the placed sports bet, is based on second data received from the sports book server confirming the placement of the sports bet, and responsive to the sports bet being a winning sports bet, the ticket is thereafter redeemable at a sports book that is distinct from the electronic gaming machine and associated with the sports book server.

11. The electronic gaming machine of claim 10, wherein the memory device stores a plurality of further instructions that, when executed by the processor responsive to a redemption of another ticket associated with another sports bet placed apart from the electronic gaming machine being a winning sports bet ticket, cause the processor to cause a display, by the display device and in the service window, of a modification of the credit balance based, at least in part, on a value associated with the winning sports bet ticket, wherein data associated with the redemption of the winning sports bet ticket communicated to the sports book server prevents the winning sports bet ticket from thereafter being redeemable at the sports book.

12. A method of operating a device, the method comprising:

causing a display, by a display device and in a sports betting service window, of a sports bet available to be placed, the sports betting service window being distinct from a game window simultaneously displayed by the display device and controlled by a processor of an electronic gaming machine and the sports betting service window being controlled, independent of the processor of the electronic gaming machine, based on first data received from a sports book server, and responsive to a placement of the sports bet, causing a display, by the display device and in the sports betting service window, of a deduction of an amount associated with the sports bet from a credit balance, wherein a first ticket associated with the placed sports bet is associated with second data received from the sports book server confirming the placement of the sports bet, and responsive to the sports bet being a winning sports bet, the first ticket associated with the sports bet is thereafter redeemable at a sports book associated with the sports book server.

13. The method of claim 12, wherein another credit balance displayed by the display device in the game window is different from the credit balance displayed by the display device in the sports betting service window.

14. The method of claim 12, further comprising, after the placement of the sports bet, causing a display, by the display device and in the sports betting service window, of a score update associated with the sports bet.

15. The method of claim 12, further comprising, prior to the display, by the display device and in the sports betting service window, of the sports bet available to be placed, causing a display, by the display device and in the sports betting service window, of a message, based on an identification of a user, of whether the user is enabled to place the sports bet.

16. The method of claim 12, wherein the displayed sports bet available to be placed is based, at least in part, on a preexisting setting of an identified user.

17. The method of claim 12, wherein the device comprises a communication interface comprising a first SAS communication protocol serial interface connectable to a SAS communication protocol serial interface of the electronic gaming machine, and a second SAS communication protocol serial interface connectable to a SAS communication protocol serial interface of the sports book server.

18. The method of claim 17, wherein the second data received from the sports book server is translated via a protocol translator embedded in the sports book server.

19. The method of claim 12, wherein the first ticket comprises a virtual ticket.

20. The method of claim 12, further comprising, responsive to a redemption of a second ticket associated with another sports bet placed apart from the electronic gaming machine being a winning sports bet ticket, causing a display, by the display device and in the sports betting service window, of a modification of the credit balance based, at least in part, on a value associated with the winning sports bet ticket, wherein data associated with the redemption of the winning sports bet ticket communicated to the sports book server prevents the winning sports bet ticket from thereafter being redeemable at the sports book.

* * * * *